(12) United States Patent
Kepner

(10) Patent No.: US 12,545,051 B2
(45) Date of Patent: Feb. 10, 2026

(54) SWIVEL WHEEL LOCKING SYSTEM AND METHOD THEREOF

(71) Applicant: STEEL GREEN MANUFACTURING LLC, Lebanon, IN (US)

(72) Inventor: James Kepner, Lebanon, IN (US)

(73) Assignee: STEEL GREEN MANUFACTURING LLC

(*) Notice: Subject to any disclaimer, the term of this patent is extended or adjusted under 35 U.S.C. 154(b) by 363 days.

(21) Appl. No.: 17/953,061

(22) Filed: Sep. 26, 2022

(65) Prior Publication Data

US 2023/0095457 A1   Mar. 30, 2023

Related U.S. Application Data

(60) Provisional application No. 63/248,023, filed on Sep. 24, 2021.

(51) Int. Cl.
*B60B 33/02* (2006.01)
*F15B 15/26* (2006.01)

(52) U.S. Cl.
CPC ............ *B60B 33/026* (2013.01); *F15B 15/26* (2013.01)

(58) Field of Classification Search
CPC ...... B60B 33/02; B60B 33/026; B60B 33/028
See application file for complete search history.

(56) References Cited

U.S. PATENT DOCUMENTS

| | | | | |
|---|---|---|---|---|
| 575,815 A * | 1/1897 | Todd | ................... | B60B 33/0002 248/600 |
| 1,896,234 A * | 2/1933 | Hathorn | .................. | B64C 25/50 244/109 |
| 2,132,973 A * | 10/1938 | Schreck | .................. | B60B 33/02 280/47.371 |
| 2,154,525 A * | 4/1939 | Noros | ..................... | B60B 33/02 16/35 R |
| 2,583,858 A * | 1/1952 | Kostolecki | .............. | B60B 33/02 280/80.1 |
| RE23,459 E * | 2/1952 | Budnick | ................. | B60B 33/02 244/109 |
| 3,699,609 A * | 10/1972 | Spatz | ...................... | B60B 33/08 16/44 |
| 4,246,677 A * | 1/1981 | Downing | ................ | B60B 33/02 16/35 R |
| 4,336,629 A * | 6/1982 | Jarvis, Jr. | ............ | B60B 33/0078 16/35 R |

(Continued)

*Primary Examiner* — Emily M Morgan
(74) *Attorney, Agent, or Firm* — Tyler B. Droste; Gutwein Law

(57) ABSTRACT

A wheel locking apparatus for locking the movement of a wheel assembly, said apparatus including an actuating means and a locking assembly. The locking assembly can include at least one locking arm. The actuating means can be configured to extend a locking arm from a first position to a second position. The locking arm is actuated into the second position to engage an aperture of the wheel assembly thereby locking the wheel assemblies. A locking arm having a locking pin portion that can be located at the second end of the locking arm. The locking pin portion can have a cavity wherein a portion of the locking arm fits within the locking pin portion. A biasing means can be located within the cavity and allow the locking pin position to move along a linear axis when a compressive force is applied to the end of the locking pin portion.

8 Claims, 24 Drawing Sheets

(56) References Cited

U.S. PATENT DOCUMENTS

| | | | | |
|---|---|---|---|---|
| 4,349,938 A | * | 9/1982 | Fontana | B60B 33/02 |
| | | | | 16/35 R |
| 4,368,806 A | * | 1/1983 | Raineri | B60B 33/02 |
| | | | | 172/386 |
| 4,399,587 A | * | 8/1983 | Penifaure | B60B 33/02 |
| | | | | 16/35 D |
| 5,014,391 A | | 5/1991 | Schulte | |
| 5,517,718 A | | 5/1996 | Eichhorn | |
| 5,799,366 A | | 9/1998 | Zocco | |
| 5,819,514 A | | 10/1998 | Firdaus | |
| 5,983,614 A | * | 11/1999 | Hancock | B60B 33/026 |
| | | | | 16/35 R |
| 6,202,396 B1 | | 3/2001 | Thomas | |
| 6,240,713 B1 | | 6/2001 | Thomas | |
| 7,574,850 B1 | | 8/2009 | Nunez | |
| 8,282,112 B2 | | 10/2012 | Rich | |
| 2001/0029643 A1 | * | 10/2001 | Schroeder | B60B 33/0068 |
| | | | | 16/35 R |

* cited by examiner

SECTION A-A

SWIVEL WHEEL LOCKING SYSTEM AND METHOD THEREOF

CROSS-REFERENCE TO RELATED APPLICATION

This U.S. Patent Application claims priority to U.S. Provisional Application: 63/248,023 filed Sep. 24, 2021, the disclosure of which is considered part of the disclosure of this application and is hereby incorporated by reference in its entirety.

FIELD OF THE INVENTION

This invention relates generally to lawn mowers, material spreaders, and other equipment, and particularly relates to a front wheel swivel assemblies used on such equipment which can be selectively locked into a straight-ahead orientation during operation of the equipment and by use of controls within the operator's reach during normal cutting operation of the equipment.

BACKGROUND

Many different types of equipment, such as lawn care equipment and farming implements can use a caster or swivel wheel assembly. The caster/swivel wheels can pivot or steer with respect to a mowing deck, spreader, or other implement when the piece of equipment is turned, so that the operator is not required to raise the front or rear of the equipment, or slide the wheels over the ground, during a turn. Caster wheels reduce the effort required to maneuver the equipment through a turn. Each caster wheel may include an upright shaft which may be pivotally held within a cylindrical opening. As the vehicle or equipment, such as a zero-turn mower, makes a turn, the shaft pivots within the opening to allow the caster wheel to pivot. Thus, the caster wheels generally prevent turf or the ground from being scuffed or otherwise damaged during a turn of a mower or implement while also allowing for easier maneuverability of the vehicle itself.

In the lawn care industry, these caster wheels are most often found mounted on the front portion of a riding or push mower. These wheel assemblies are often present in zero turn mower applications. Some mowers allow an operator to lock the front caster wheels for straight, lengthy cuts. Locking the front caster wheels also may help the mower maintain a straight cutting path along the side of a hill or bank by preventing the mower from sliding sideways down the slope. The caster wheel locking mechanisms may be mechanically actuated at or adjacent the pivoting shaft of each caster wheel. Additionally, during straight travel, the operator may engage a self-propel rear wheel drive mechanism using a lever or control located on or adjacent the mower handle.

When the operator needs to turn the mower, he or she may disengage the self-propel drive mechanism to stop the mower, and then disengage each of the caster wheel locking mechanisms. When a caster wheel is in a locked position the mower does not obtain the full benefit of the caster wheels during a turn and would be prevent from turning. After turning the mower, the operator may lock the casters again, and then engage the self-propel drive mechanism to resume a straight cutting path. Current mechanism such as those disclosed in U.S. Pat. No. 8,282,112 and U.S. Pat. No. 7,574,850 require manual engagement by a user to that can result in a user removing their hand while the vehicle is in operation or using their foot to exert a physical force placing the user in an unbalanced position while also risking sliding off of the equipment.

An electronically assisted ("e-assisted") caster wheel locking system is needed for a mower and other equipment to reduces the time and effort to engage the front caster wheels during straight cuts and disengage the front caster wheels during turns. A more efficient and easier to operate caster wheel locking system is needed that increases productivity by allowing engagement and disengagement of the front caster wheels without stopping the mower or requiring the user to be placed in a vulnerable position while the equipment is in operation. Additionally, the e-assisted wheel locking system of the present disclosure prevent user strain and fatigue when engagement and disengagement of the wheels is required frequently during operation of the equipment.

BRIEF SUMMARY OF THE INVENTION

In one aspect, this disclosure is related to a wheel locking apparatus for selectively locking the movement of a swivel castor wheel assembly, said apparatus including a housing member, an actuating means, and a locking assembly. The locking assembly can include a first locking arm and a second locking arm. The actuating means is configured to extend the first locking arm and the second locking arm from a first position to a second position. When the locking arms are actuated into the second position, they engage an aperture of the castor wheel assembly.

In another aspect, this disclosure is related to a locking arm assembly can be coupled to an end of the actuating means. The locking arm assembly can further include a moveable arm, a locking pin portion, and a biasing means. The moveable arm can have a first end and a second end, wherein the arm is configured to be moved from a first position to a second position. The locking pin portion having a first end and a second end, wherein the locking pin portion can include an exterior body portion, an interior housing cavity at the first end and an engagement member at the second end. In some embodiments, the first portion of the moveable arm portion can be positioned within the interior housing cavity. The biasing means can be positioned within the interior housing cavity between the first end of the moveable arm and an interior wall of the interior housing cavity. The biasing means can be configured to allow the locking pin portion to move from a first position to a second position and maintain a pressure against a flange wall of a wheel assembly when the actuating means moves the locking arm assembly from a first position to a second position.

In yet another aspect, this disclosure is related to a vehicle having a pair of rotatably mounted wheel assemblies to a frame. The wheel assemblies can include a body portion with an engagement flange, wherein the engagement flange includes a flange wall and a flange aperture formed within the flange wall. The wheel assembly can additionally include a wheel portion. A locking mechanism for selectively locking and unlocking the pair of rotatable wheels assemblies between being freely rotatable and in a forward direction on the frame can be included on the vehicle. The locking mechanism can include an actuating means and a locking arm assembly. The locking arm assembly can be coupled to an end of the actuating means. The locking arm assembly can further include a moveable arm, a locking pin portion, and a biasing means. The moveable arm can have a first end and a second end, wherein the arm is configured to be moved from a first position to a second position. The locking pin portion having a first end and a second end, wherein the locking pin portion can include an exterior body portion, an interior housing cavity at the first end and an engagement member at the second end. In some embodiments, the first portion of the moveable arm portion can be positioned within the interior housing cavity. The biasing means can be positioned within the interior housing cavity between the first end of the moveable arm and an interior wall of interior housing cavity. The biasing means can be configured to allow the locking pin portion to move from a first position to a second position and maintain a pressure against a flange wall of a wheel assembly when the actuating means moves the locking arm assembly from a first position to a second position. The wheel assembly can rotate around, and the engagement member can maintain contact with the flange wall until the wheel rotates into a position wherein the flange aperture is engaged by engagement member due to the pressure exerted by the biasing means.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

The features and advantages of this disclosure, and the manner of attaining them, will be more apparent and better understood by reference to the following descriptions of the disclosed system and process, taken in conjunction with the accompanying drawings, wherein.

DETAILED DESCRIPTION OF THE INVENTION

Figure 1A:
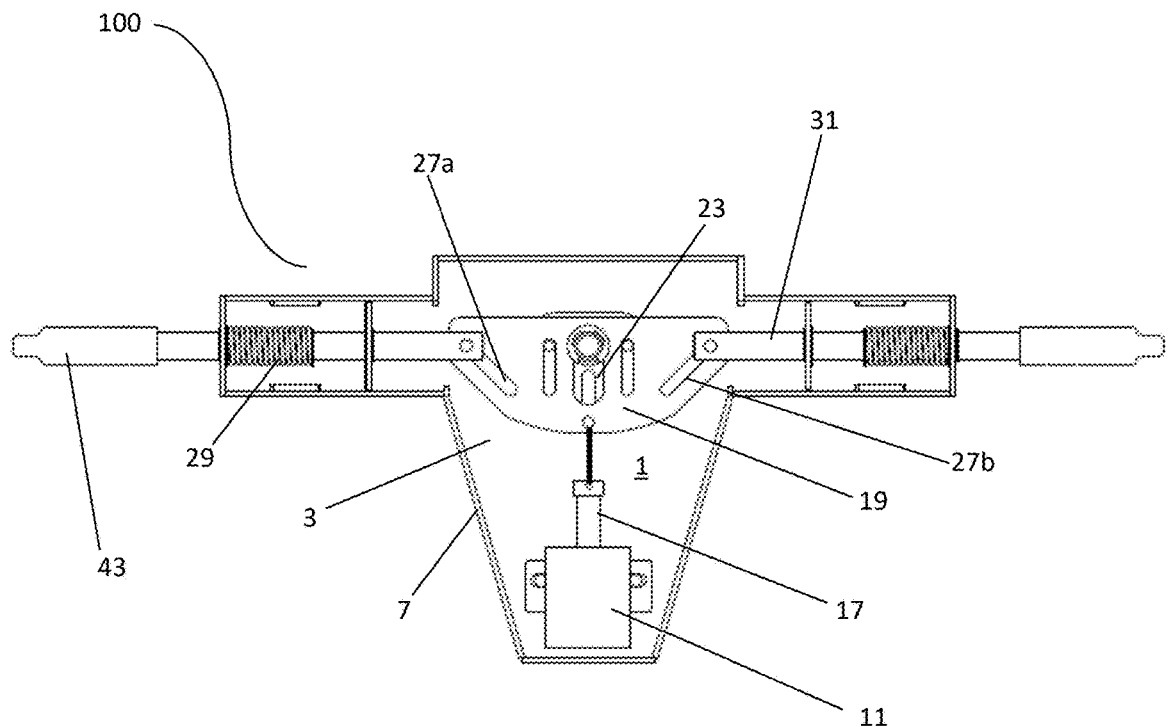
FIG. 1A is a bottom perspective view of an exemplary embodiment of a wheel locking apparatus of the present disclosure, wherein the locking means is in a locked position.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention of this disclosure is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the term "coupled" means the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Figure 1B:
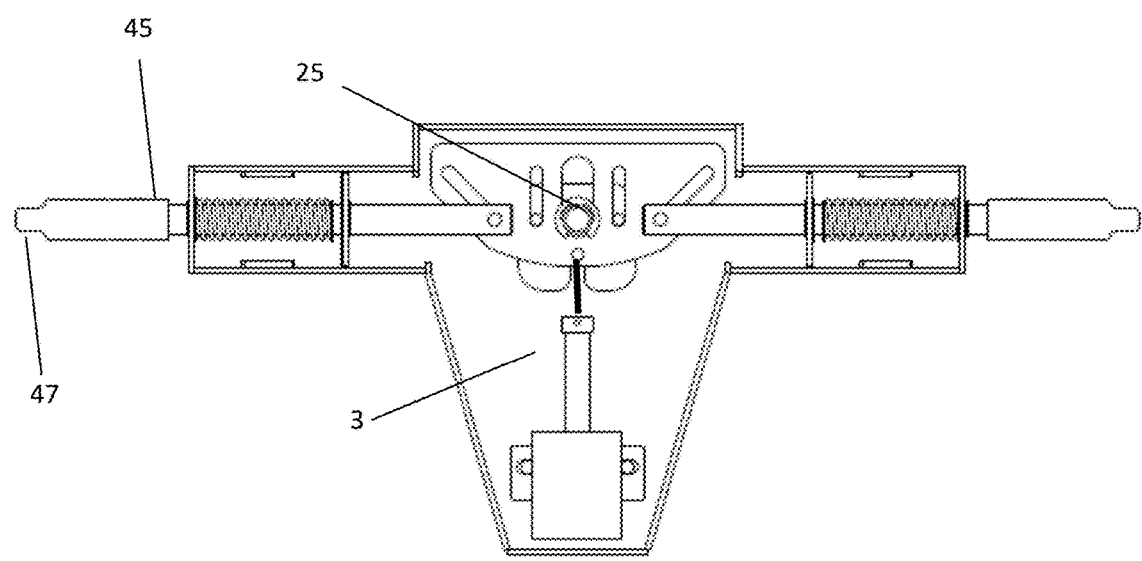
FIG. 1B is a bottom perspective view of an exemplary embodiment a wheel locking apparatus of the present disclosure of FIG. 1B, wherein the locking means is in an unlocked position.
Figure 1C:
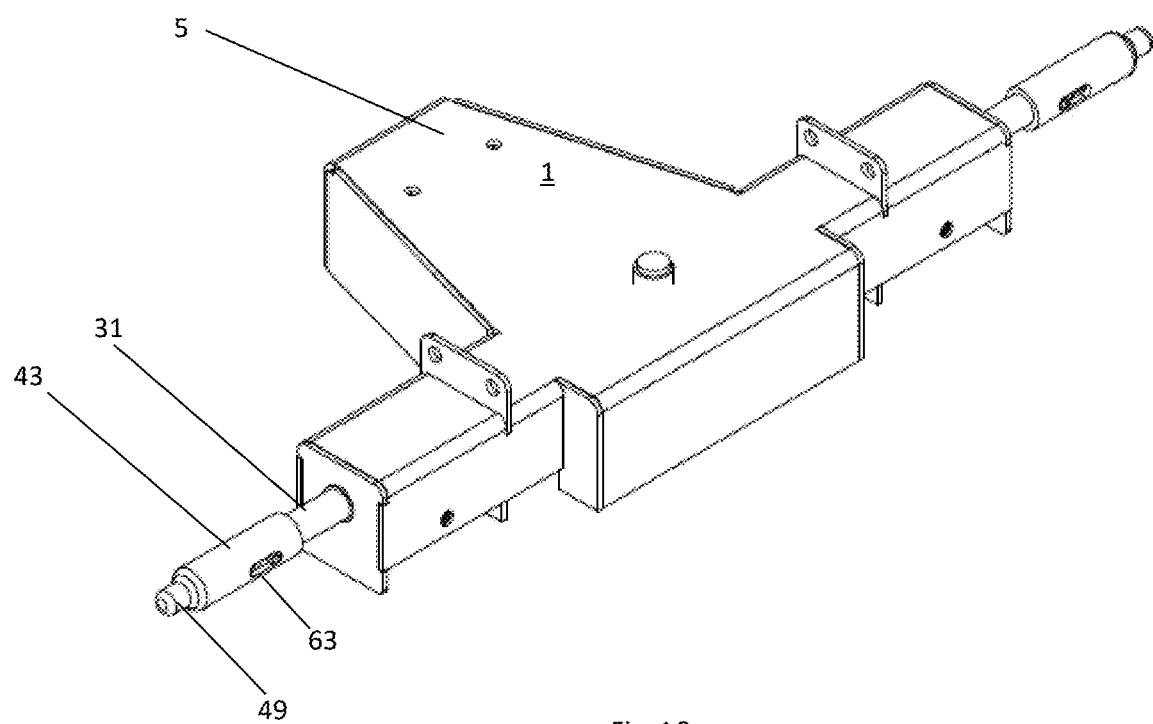
FIG. 1C is a top perspective view of an exemplary embodiment of a locking means of the wheel locking assembly of the present disclosure.
Figure 6A:
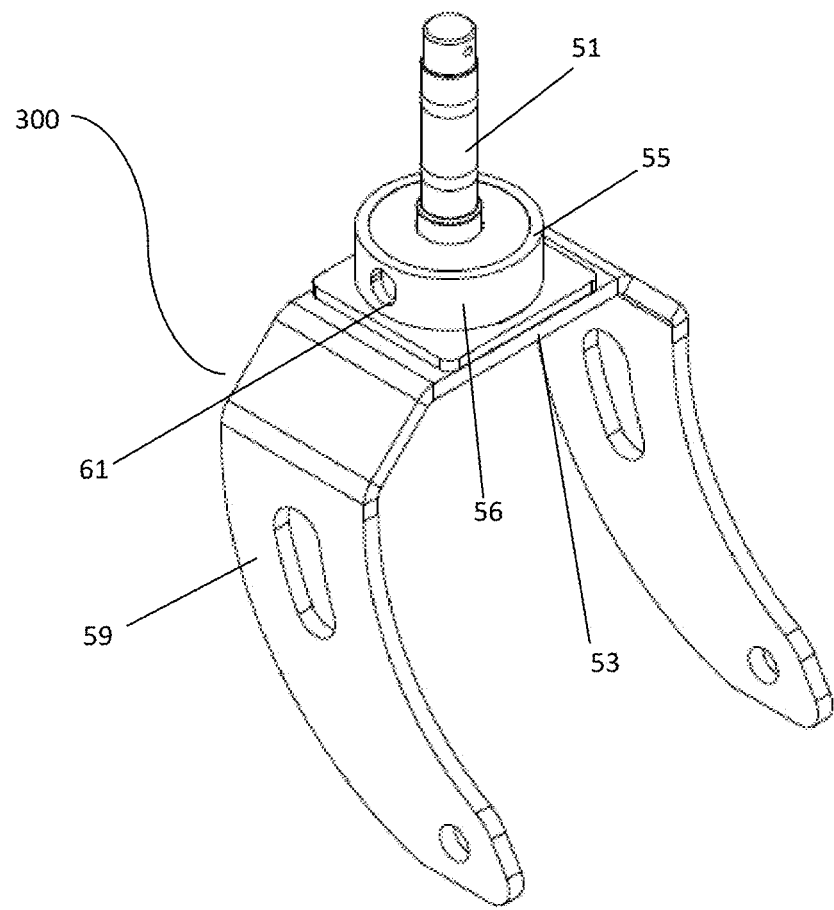
FIG. 6A is a perspective view of a caster wheel assembly of an exemplary embodiment of the present disclosure.
Figure 6B:
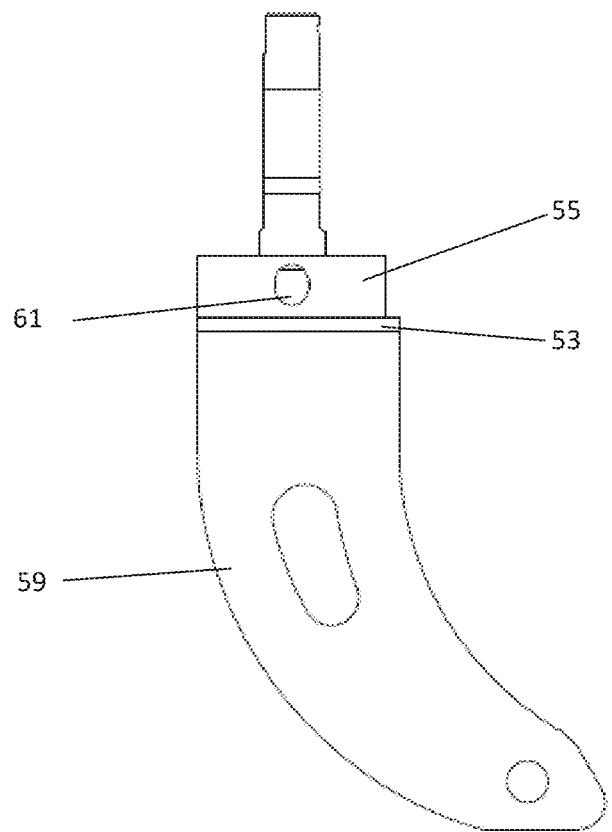
FIG. 6b is a side view of a caster wheel assembly of an exemplary embodiment of the present disclosure.

Referring to FIG. 1, the present disclosure includes a locking assembly 100 configured to interact with one or more caster wheel assemblies 300 shown in FIG. 6A-B. In an exemplary embodiment, a locking assembly 100 can include a housing member 1 having a first side 3 and second side 5. In one exemplary embodiment, the housing member 1 can have one or more sidewalls 7 to form an interior portion 9 of the housing member 1. Within the housing member 1 can be one ore more actuating means 11, such as an actuator, piston, solenoid, hydraulic actuator, or any other suitable means. The actuator can be coupled to a wall of the housing. The actuating means 11 can have a first end 13 and a second end 15, wherein the second end can have a moveable portion 17 and can move between a first position and second position. In some embodiment, the moveable portion can be a piston or arm 31 actuated by a solenoid. In one exemplary embodiment, the first position can be an extended position and the second position can be a retracted position.

Figure 2:
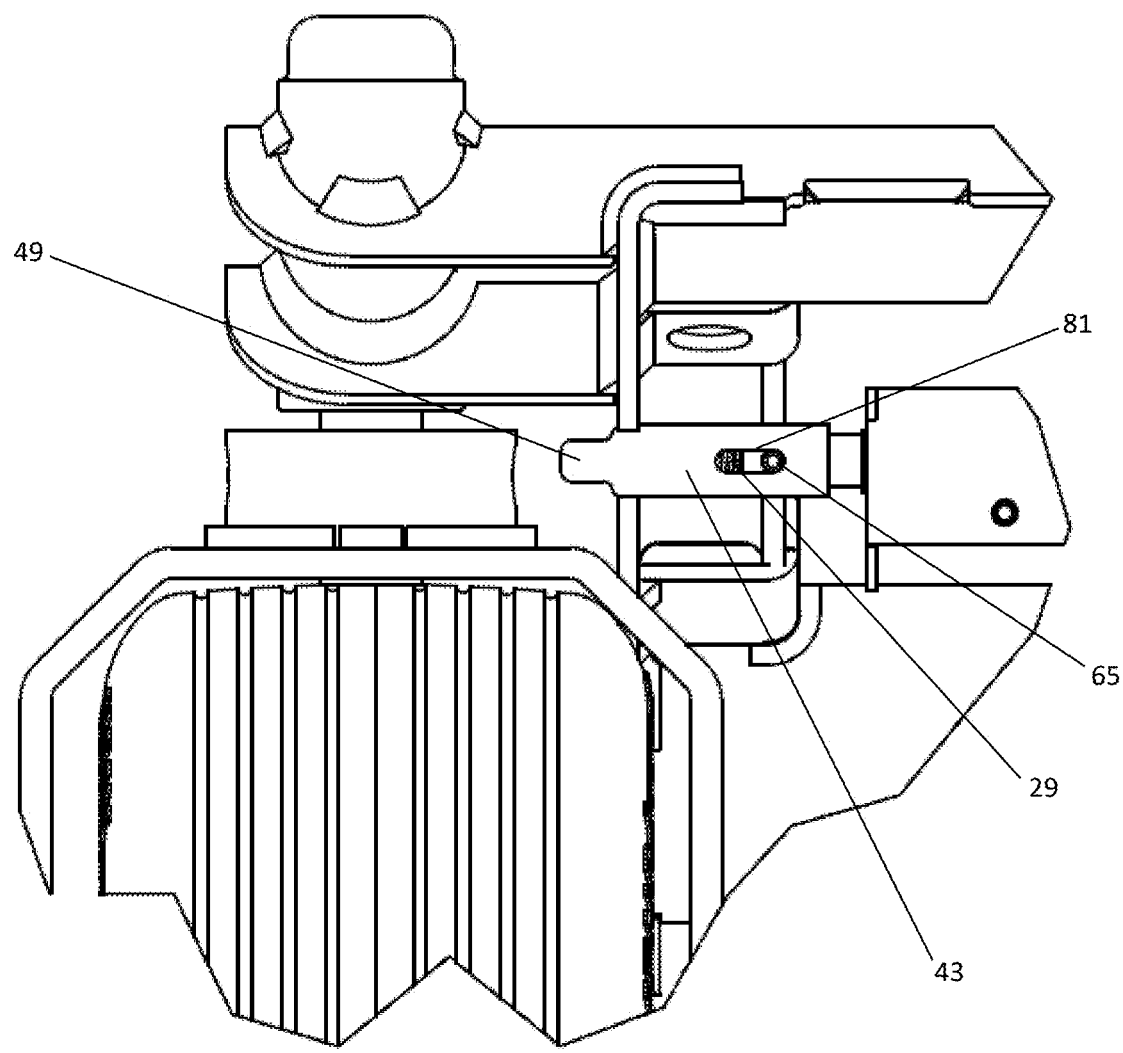
FIG. 2 is a perspective view of an exemplary embodiment of an engagement member of the locking assembly in an uncompressed position when the locking arm is in a retracted position, wherein the wheel locking assembly is coupled to a vehicle next to a corresponding wheel assembly.
Figure 3:
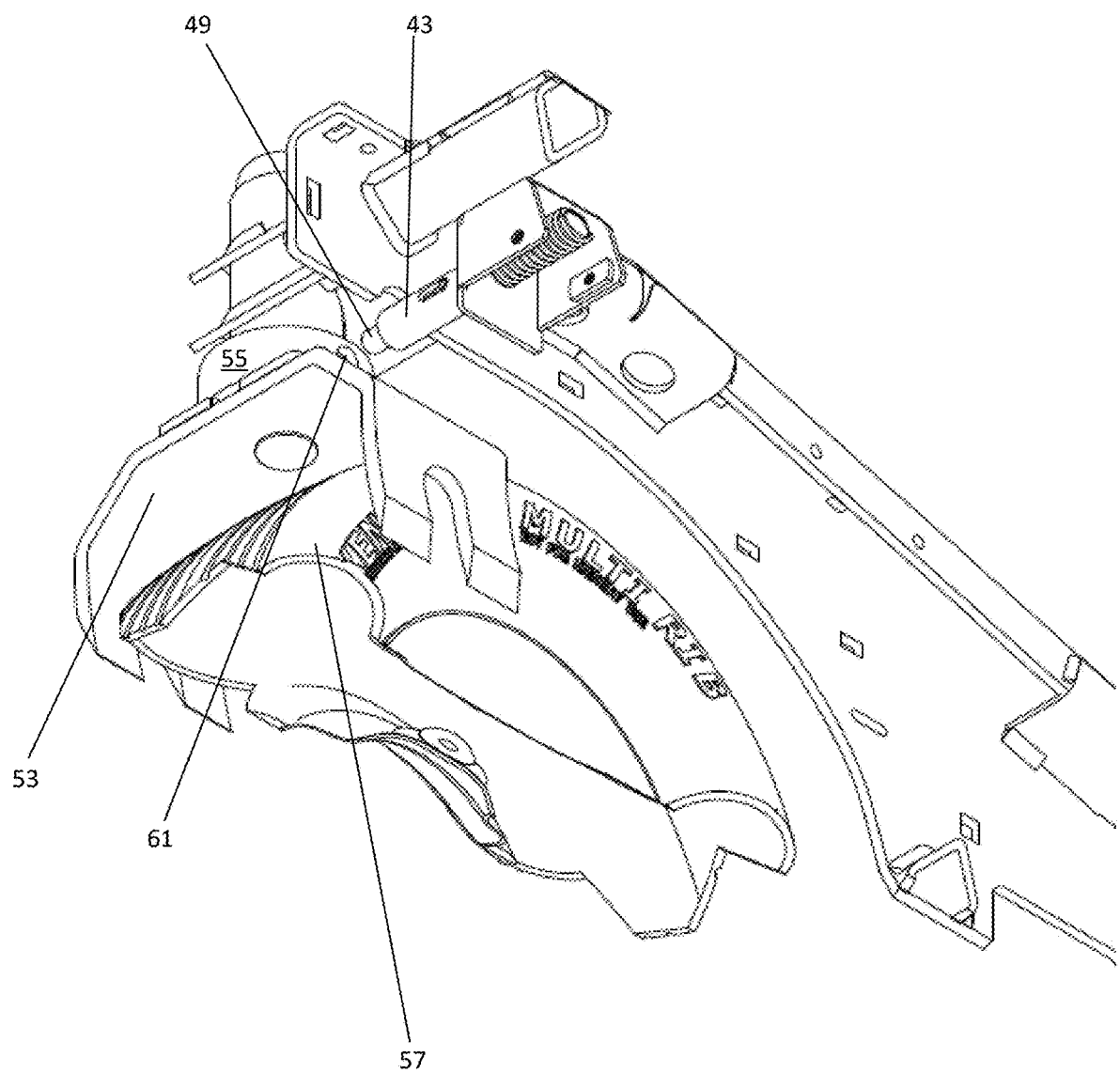
FIG. 3 is a perspective view of an exemplary embodiment of an engagement member proximate to a swivel wheel assembly in a retracted position of FIG. 2.
Figure 4:
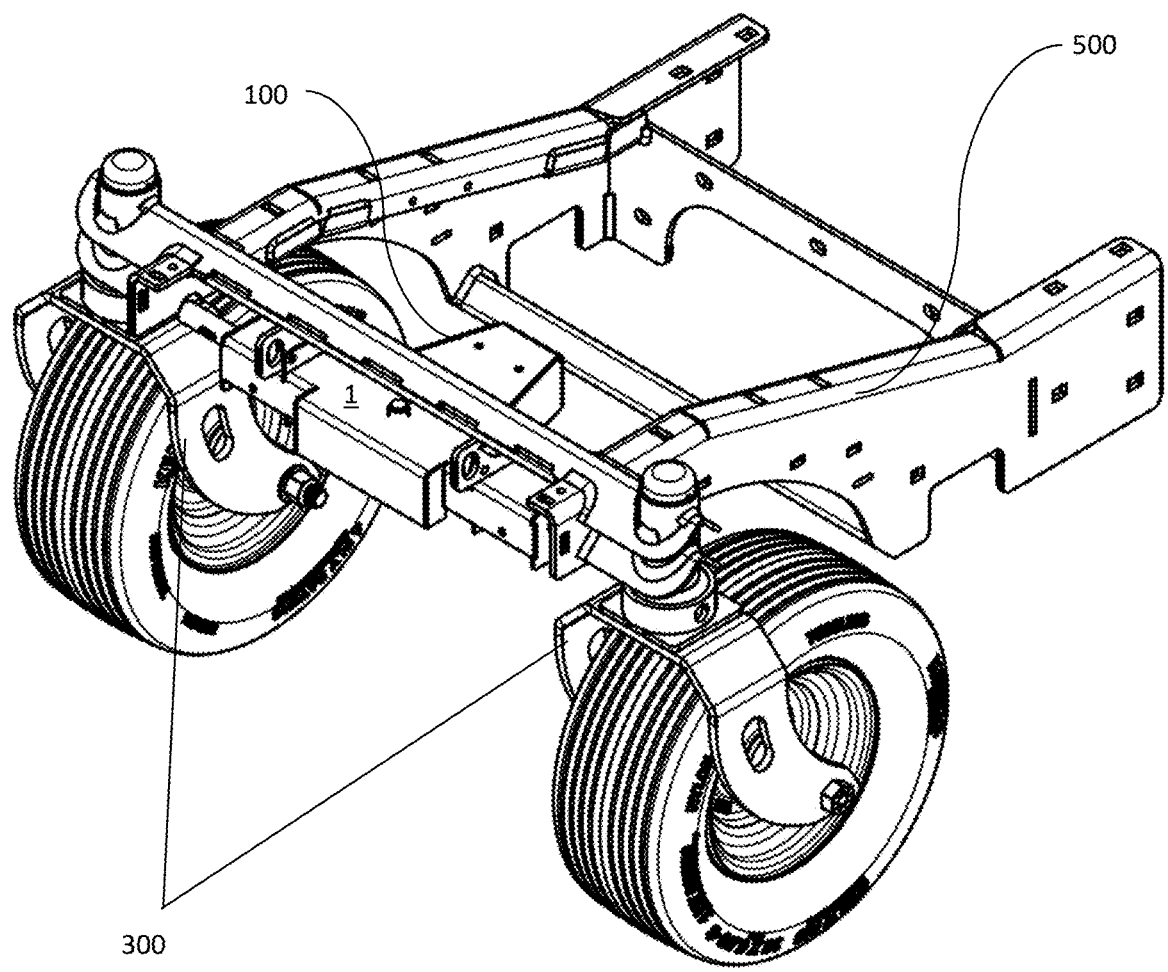
FIG. 4 is a perspective view of the wheel locking assembly and wheel assemblies of piece of equipment.
Figure 5:
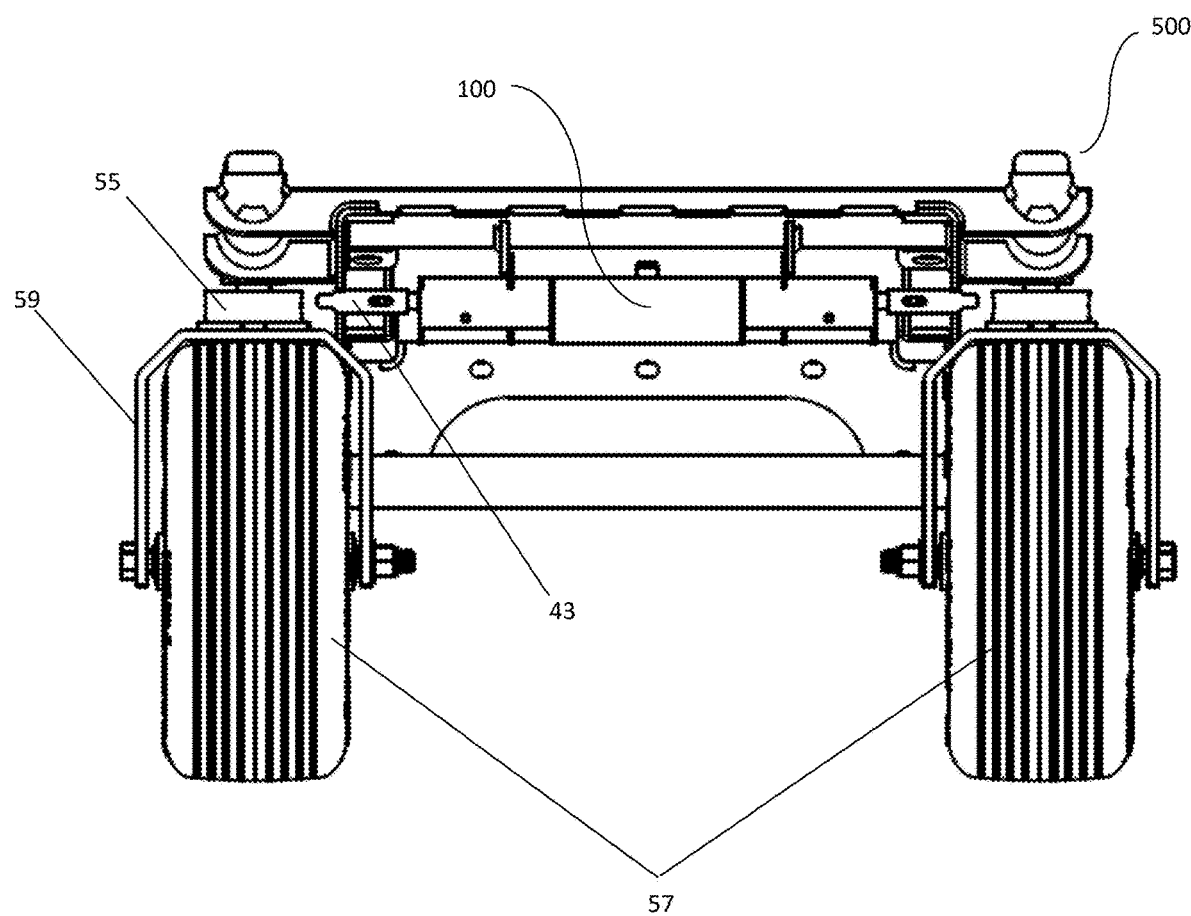
FIG. 5 is a front view of the wheel locking assembly and caster wheel assemblies of piece of equipment.

In one exemplary embodiment, the actuating means 11 can be coupled to a locking means. The locking means or locking portion can have a first locking arm 31 having a first end 33 and second end 35 and a second locking arm 37 having a first end 39 and a second end 41. The locking arms can extend from generally the center of the housing and extend in a linear direction out from the center of the housing. As shown in FIGS. 1-3, each of the locking arms 31, 37 can have a locking pin portion 43. Each locking pin portion 43 can have a first end 45 and a second end 47. On one of the ends, the locking pin portion 43 can have an engagement member 49 that is configured to engage with a portion of one of the wheel assemblies. In some exemplary embodiments, the engagement member 49 can be coupled to the locking pin portion or formed as part the locking pin portion 43. The engagement member 49 can have a first diameter. The first diameter can be the same or slightly smaller than that of the engagement aperture 61 diameter. The locking pin portion 43 can have a second diameter. In one exemplary embodiment, the first diameter is smaller than the second diameter. In one exemplary embodiment, the locking pin portion 43 can have an interior portion that approximates the outer diameter of the locking arms 31, 37. The engagement member 49 can additionally have a friction reducing end 68, including but not limited to rounded end or alternatively have a bearing/ball point member formed at the end to allow the engagement member to freely move along the wall of the engagement flange 55 when the engagement member 49 is contacting the engagement flange wall 56, In The locking pin portion 43 can be moveable between its own first and second position. In one exemplary embodiment, the locking pin portion 43 can use a compressive member/biasing means 29, such as a spring/biasing means to allow the pin 43 to be moveable between positions. In some embodiments, the compressive member 29 can be at least partially or fully housed within the interior portion of the locking pin portion. Alternatively, the compressive member 29 can be located on the exterior wall 96 of the locking pin portion 43. The compressive member 29 can be positioned against the first edge 91 of the locking pin portion. Located on the other side of the compressive member can be bracing member that is configured to prevent the movement of the compressive member 29 and allow for the compressive member to exert a compressive force against the locking pin portion 43.

Additionally, the locking pin portion 43 can have one or more channels 63. A locking pin post member 65 can extend generally perpendicularly from the locking arms 31,37 and sit within the channels 63 of the locking pin portion 43. The post member 65 can be configured to allow the locking pin portion 43 to move in along a linear plane when the locking pin 43 is under a compressive force and the biasing means 29 becomes compressed. In one exemplary embodiment, when the locking arms 31, 37 are extended in a second position, the wheel assembly may need to rotate around to allow for the engagement members 49 of the locking pin portion 43 to engage an aperture 61 of the wheel assemblies 300. The locking pin portions 43 can remain in a compressed state until the wheel rotates into the path of the locking pin portion and allows the engagement member 49 to interface with the aperture 61 of the wheel assembly.

In some exemplary embodiments as shown in FIGS. 1-2, the locking means can be located within the interior portion housing 1 and include a moveable member 19. The moveable member 19 can be moved by the actuating means 11. In one exemplary embodiment, the locking arms can be coupled to the moveable member 19, wherein the moveable member is configured to extend both locking arms 31, 37 simultaneously from a retracted position to an extended position and visa versa. In some exemplary embodiments, the locking arm 31 can be coupled to the actuator or be formed as part of the actuator 11 itself.

A moveable member 19 can be a sliding member as shown in FIGS. 1A-B. The sliding member 19 can be coupled to the second end of the actuating means 11. In some embodiments, a cable, wire, rod, or any other suitable connection member 21 can be used to couple the sliding member to the actuating means. The sliding member can have a plurality of apertures and channels. As shown in in FIG. 1, a first channel 23 can be formed proximate to the center of the sliding member 19, wherein the channel 23 is configured to interact with a support post 25. The support post and channel help to guide the sliding means along a generally linear path when the actuating means is actuated from the retracted position to the extend position and vis versa. Additionally, one or more additional secondary channels 27 can be formed in the sliding member 19. In some exemplary embodiments, the secondary channels can correspond to sliding post located proximate to the first end of each of the locking arms. The sliding post can interface within the respective secondary channels of the sliding member.

Additionally, in one exemplary embodiment, the secondary channels 27 can be formed at an angular direction in relation to the primary channel 23. Sliding post 25 can interface with the secondary channels of the sliding member. When the sliding member and actuator is in a first position as shown in FIG. 1A, the locking arms 31.37 are in a first position. When the actuator 11 is moved into the second position, the sliding member 19 moves in a linear direction along the post of the first channel 23. Similarly, the movement of the sliding member 19 into a second position causes the sliding post to travel along the secondary channels 27, which in turn cause the locking arms to move into a extend position as shown in FIG. 1B.

Alternatively, the moveable member can be a rotatable member that can have an aperture that can allow the rotatable member to rotate around the support post. On each side of the rotatable member a locking arm can be coupled. When the rotatable member is moved around the post, the locking arms can be extended out to engage the and interface the aperture of the caster wheel assembly. In yet another embodiment, the locking arms can each be directly coupled to an individual actuating means, where in the actuating means directly move the locking arms form a retracted position to an extended position.

As shown in FIGS. 3 and 6A-B, the wheel assembly 300 can include a body portion and a wheel portion 57. The body portion can include spindle portion 51, a yoke portion 53, an engagement flange portion 55. The yoke portion 53 can have a generally horizontally planar portion with one or more arms 59 that extends down generally in a vertical direction from horizontally planar portion of the yoke 53. The arms 59 can house a wheel 57 that is coupled to the yoke 53 using an axel. In some exemplary embodiments, the engagement flange portion 55 can be located above the horizontal portion of the yoke 53. The engagement flange portion 55 can have one or more engagement apertures 61 configured to interface with the engagement member of the locking pin portions 43 of the wheel locking assembly. A spindle portion 51 can extend vertically from the horizontal portion of the yoke.

The present disclosure can provide for retrofitting current vehicles, such as lawnmowers with the wheel locking assembly 100 and new or modified castor wheel assemblies 300. In some embodiments, existing wheel assemblies 300 can be retrofitted with an engagement flange portion 55 having one or more apertures 61. The engagement flange 55 can be generally circular in orientation and can be coupled to existing wheel assemblies 300 using any suitable means such as adhesive, welding, or fastening means. The engagement flange 55 can have a flange wall 56. Similarly, the wheel locking assembly can be coupled to an existing vehicle to allow a user to lock the rotatable wheel assemblies 300, such as a castor wheel, in a fixed position. The wheel locking assemblies 100 can be coupled to the vehicle using any suitable means. The wheel locking assemblies 100 can have one or more mounting brackets 89 located on the housing to allow for easy installation of the assemblies to existing vehicles 500.

Figure 7:
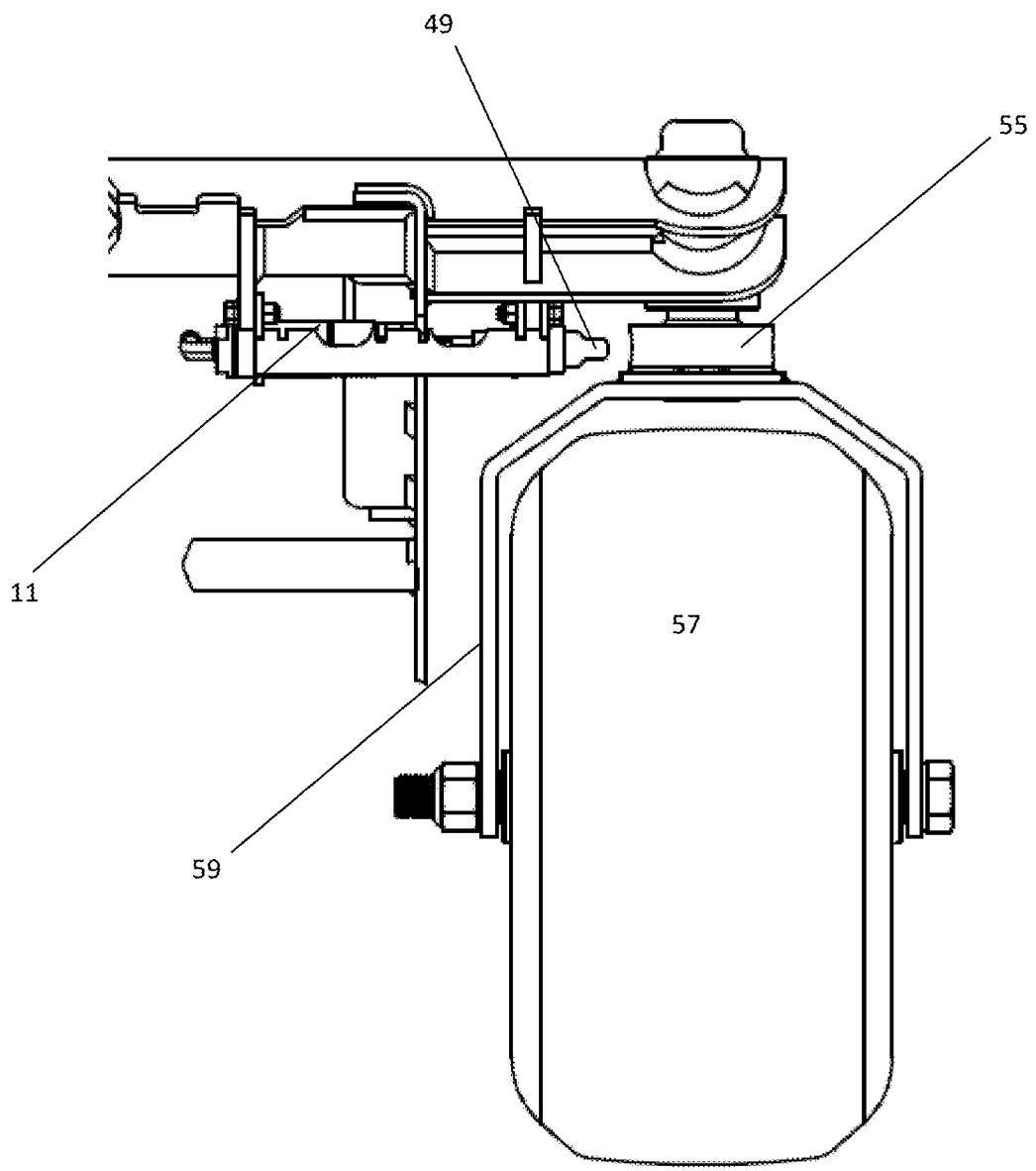
FIG. 7 is a front view of an exemplary embodiment of a wheel locking assembly of the present disclosure.

In another exemplary embodiment as illustrated in FIGS. 7-15 a wheel locking assembly for various implements including but not limited to a powered material spreader. As shown in FIG. 7, in some exemplary embodiments, the wheel locking assembly 100 can include one or more actuators/actuating means/cylinders located proximate to a wheel assembly. The actuating means 11 can be positioned in a relative position to the wheel assembly 300 as desired, including but not limited to parallel to the general direction of travel or perpendicular to the general direction of travel of the wheel. A flange aperture 61 can be positioned appropriately to ensure when the locking assembly 100 is engaged that the wheels 57 are locked into a straight and forward position of travel. The engagement flange portion 55 can additionally include an aperture 61. The wheel assembly 300 can additionally be used to house a wheel 57. The system can be communicatively coupled to a controller, control board, or control system 600 that can allow for user to engage or disengage the wheel locking system engagement members. The actuating means 11 can be any suitable form, including but not limited to electrical or hydraulic actuators. In one exemplary embodiment shown in FIG. 8, the system can utilize a hydraulic actuating system which can include on or more switches 95 communicatively coupled to a control system 600 to allow for the user to easily control whether the wheel assemblies are in a locked position or an unlocked (free rotating position).

In some exemplary embodiments, the one or more actuating means 11 can be communicatively coupled to a control module including a button/switch 95, wherein a user can depress the button and initiate a locking or unlocking command from the control module to the actuating means 11. This control module system can be installed along with the locking assembly to allow a user an easier and more efficient manner to lock the castor wheel assemblies when desired. The control module can be electronically controlled through the use of one or more wires. The control module allows for electronic control of the actuating means to engage and disengage the wheel locking system as desired by a user.

As shown in FIGS. 8-12, the wheel locking assembly 100 can by communicatively coupled to a hydraulic system that can include one or more fluid lines 87 and/or electrical coupling various components of the wheel locking assembly to each other. In one exemplary embodiment, the actuating means 11 and system can be driven through a hydraulic system. It should be understood, that an electrical and/or a mechanical actuating system can similarly be used to activate or deactivate one or more actuating means for the wheel locking arm assemblies. The wheel locking assembly of the present disclosure can include a hydraulic pump 77 that can provide hydraulic pressure and/or fluid between various elements of the wheel locking assembly 300. The hydraulic pump can be powered by the motor of the vehicle 500 utilizing a belt to turn the pump pulley 79. A hopper throttle valve 75 and wheel locking assembly valve 73 can additionally be communicatively coupled and/or fluidly connected to the hydraulic pump 77. The wheel locking assembly valve 73 can be communicatively and/or fluidly connected to one or more locking arm assemblies 200. In some exemplary embodiments, the locking arm assemblies 200 can include an actuator cylinder 12 or other actuating means and a locking arm 31. A first end 33 of the locking arm 31 can be coupled to the actuating means 11 and the second end 35 of a locking arm can include a locking pin portion 43. The locking pin portion can include a biasing means, such as a spring, to allow the locking pin 43 portion to be moveable on the end of the second end of the locking arm. In some exemplary embodiment, the locking arm 31 can be moved from a first position to a second position. The locking pin portion 43 can include a channel 63 as shown in FIGS. 2-3 and 14A-E. The channel 63 can allow the locking pin portion 43 to move between a first position and a second position while still be maintained on the end of the locking arm 31. The locking arm 31 and locking pin portion 43 can both travel along a linear path between a first and second position to engage and disengage from engagement flange aperture 61 of the wheel assembly 200.

Figure 8:
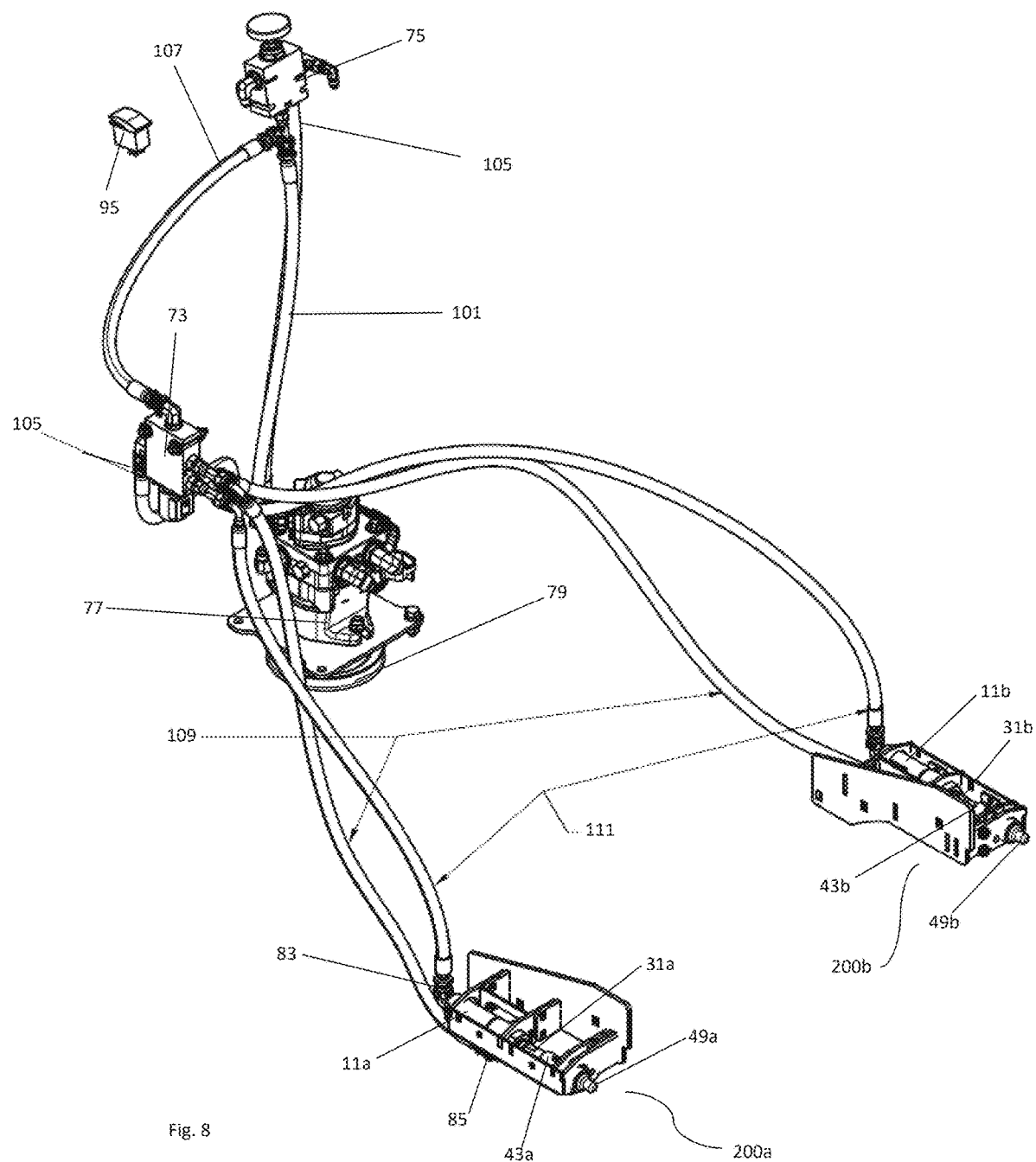
FIG. 8 is a perspective view of an exemplary embodiment of a hydraulic actuated wheel locking assembly of the present disclosure.
Figure 9:
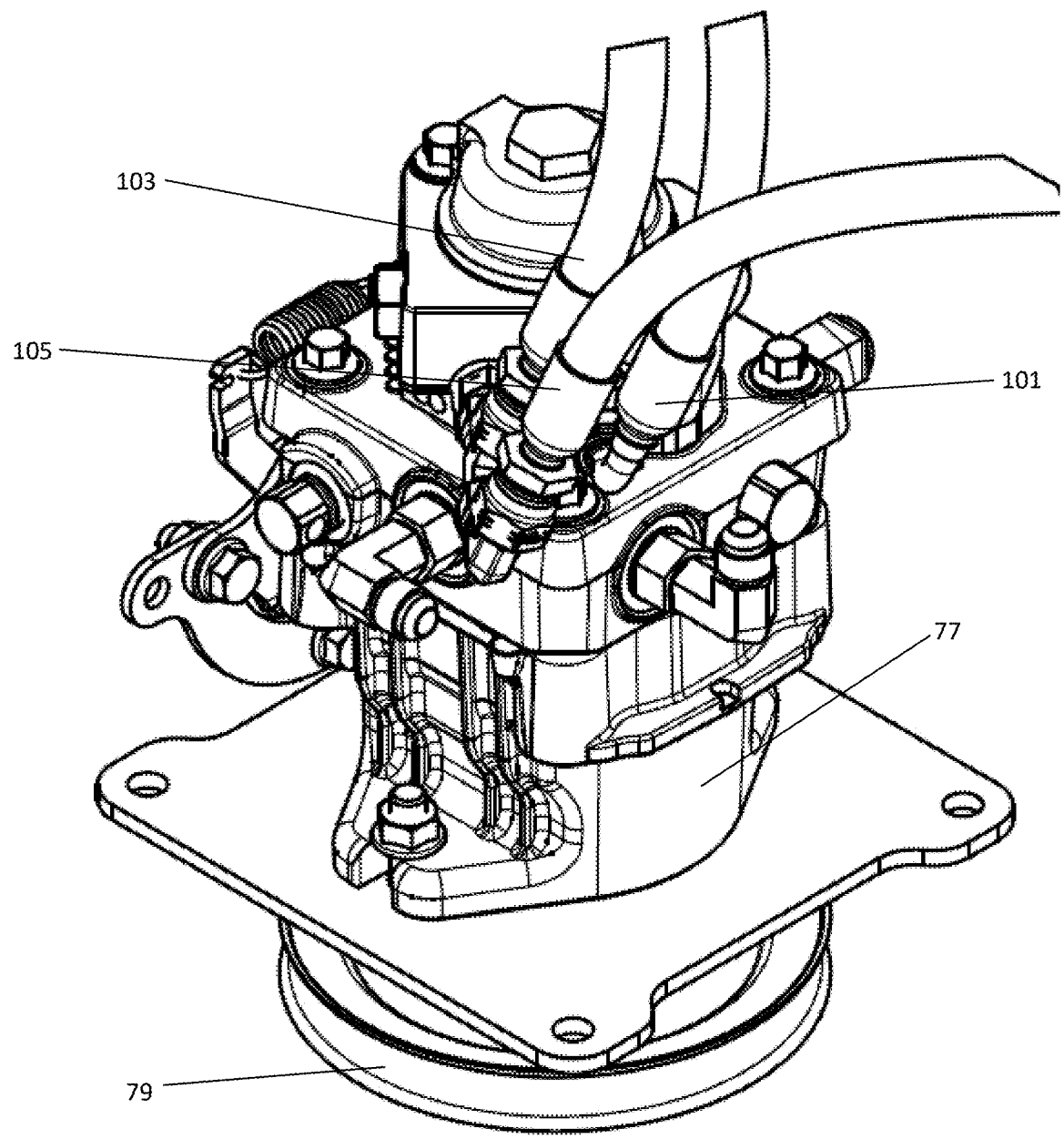
FIG. 9 is a close-up view of a hydraulic pump of an exemplary embodiment of a wheel locking assembly and engagement system of the present disclosure.
Figure 10:
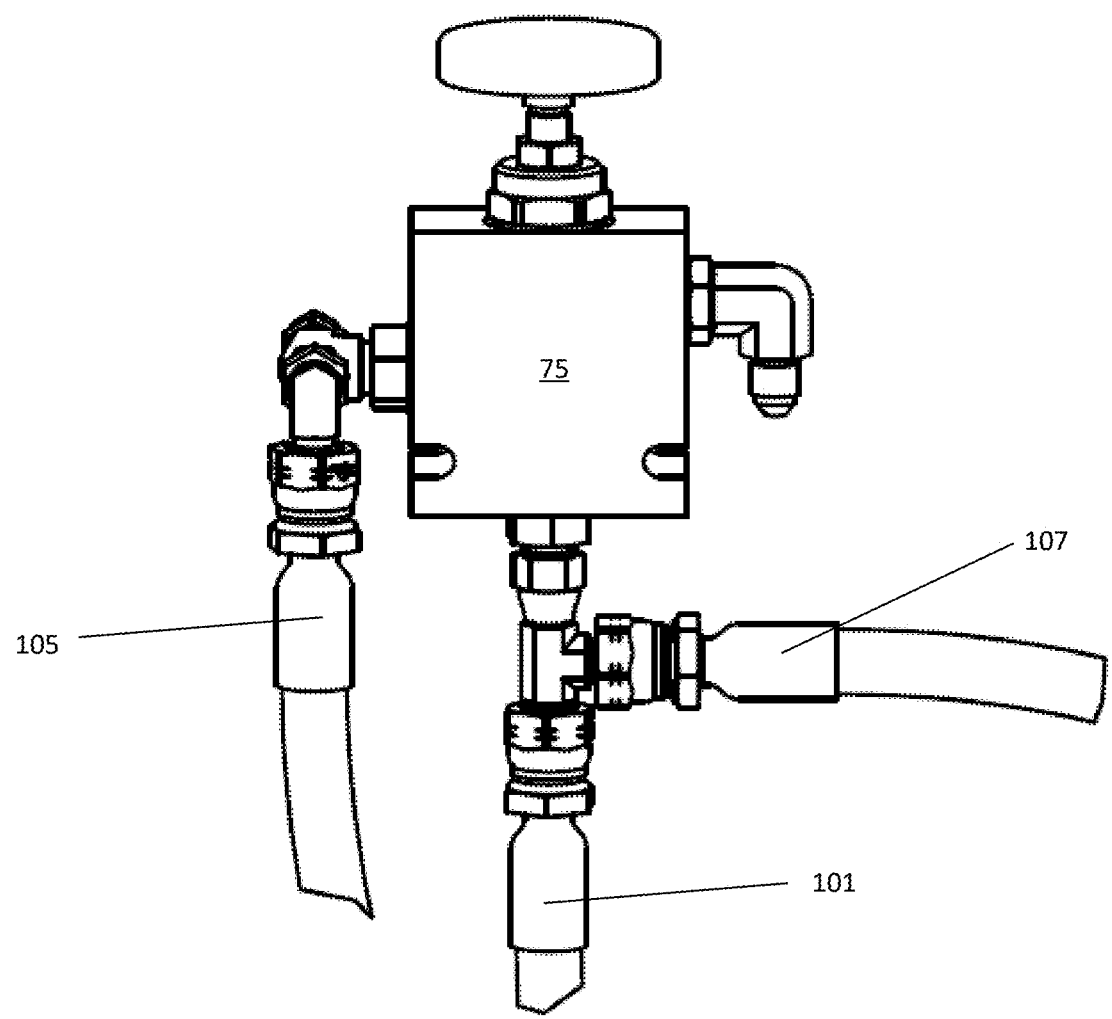
FIG. 10 is a close-up view of a hopper throttle valve and hydraulic lines of an exemplary embodiment of a wheel locking assembly and engagement system of the present disclosure.
Figure 11:
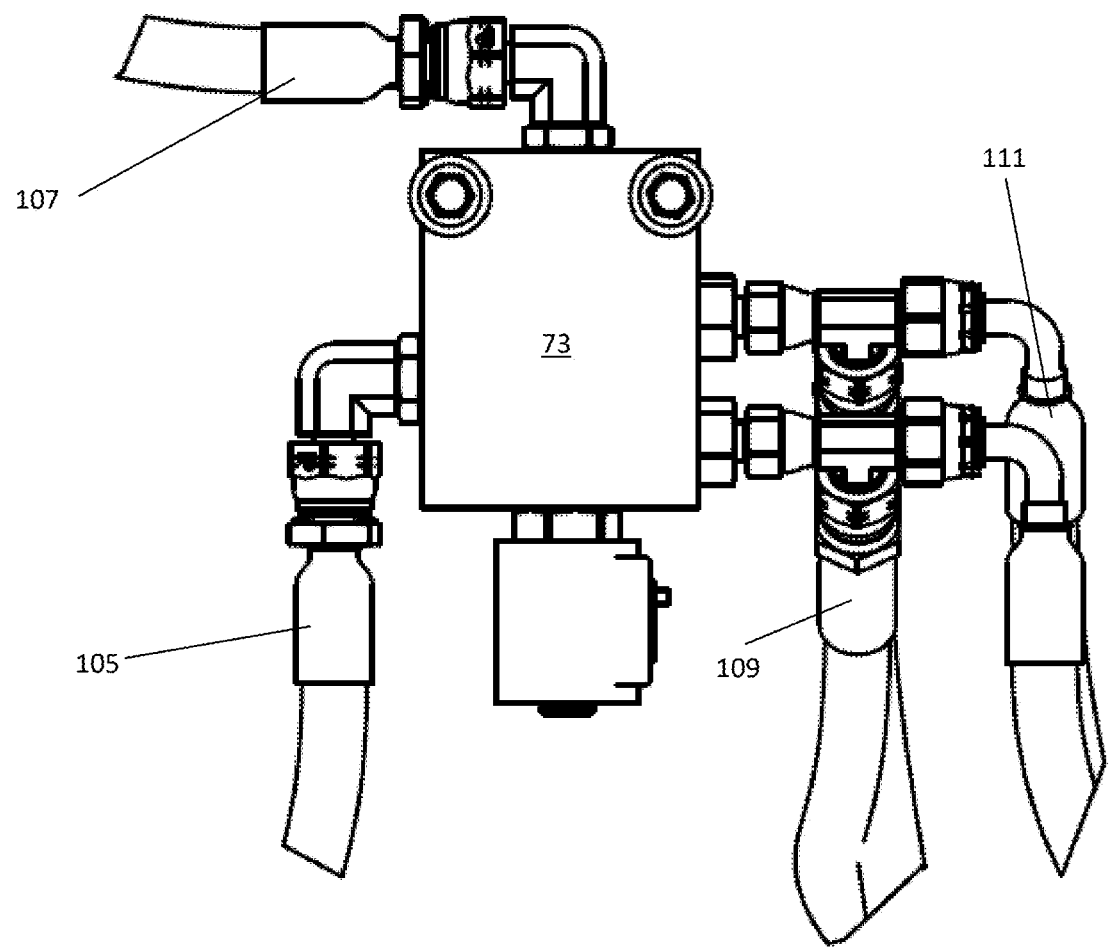
FIG. 11 is a close-up view of a wheel locking assembly valve and hydraulic lines of an exemplary embodiment of a wheel locking assembly and engagement system of the present disclosure.

In some exemplary embodiments, the hydraulic pump 77 can be fluidly connected to a hopper throttle valve 75 and a wheel locking assembly valve 73. The hydraulic pump 77 can additionally include supply and return lines to each of the valve assemblies. In one exemplary embodiment, the hydraulic pump 77 can provide a supply line 101 to the hopper throttle valve 75. Similarly, a return line 103 from the hopper throttle valve 75 can run back to the hydraulic pump 77 as shown in FIG. 10. A supply line 107 can fluidly connect the hopper throttle valve 75 to a wheel locking assembly valve 73. The wheel locking assembly valve 73 can additionally have a return line 105 to the hydraulic pump 77. The wheel locking assembly valve 73 can be fluidly connected to on or more actuators 11 coupled to the locking arm assemblies 200 using one or more hydraulic lines as shown in FIG. 8. In some exemplary embodiments, the system can have a first locking arm assembly 200a and a second locking arm assembly 200b, wherein each of the locking arm assemblies correspond to a respective wheel assembly 300. In other exemplary embodiments, the actuating means 11 can be communicatively coupled using any suitable means including electrical connections to actuate the various actuating means (i.e., solenoid).

Figure 12A:
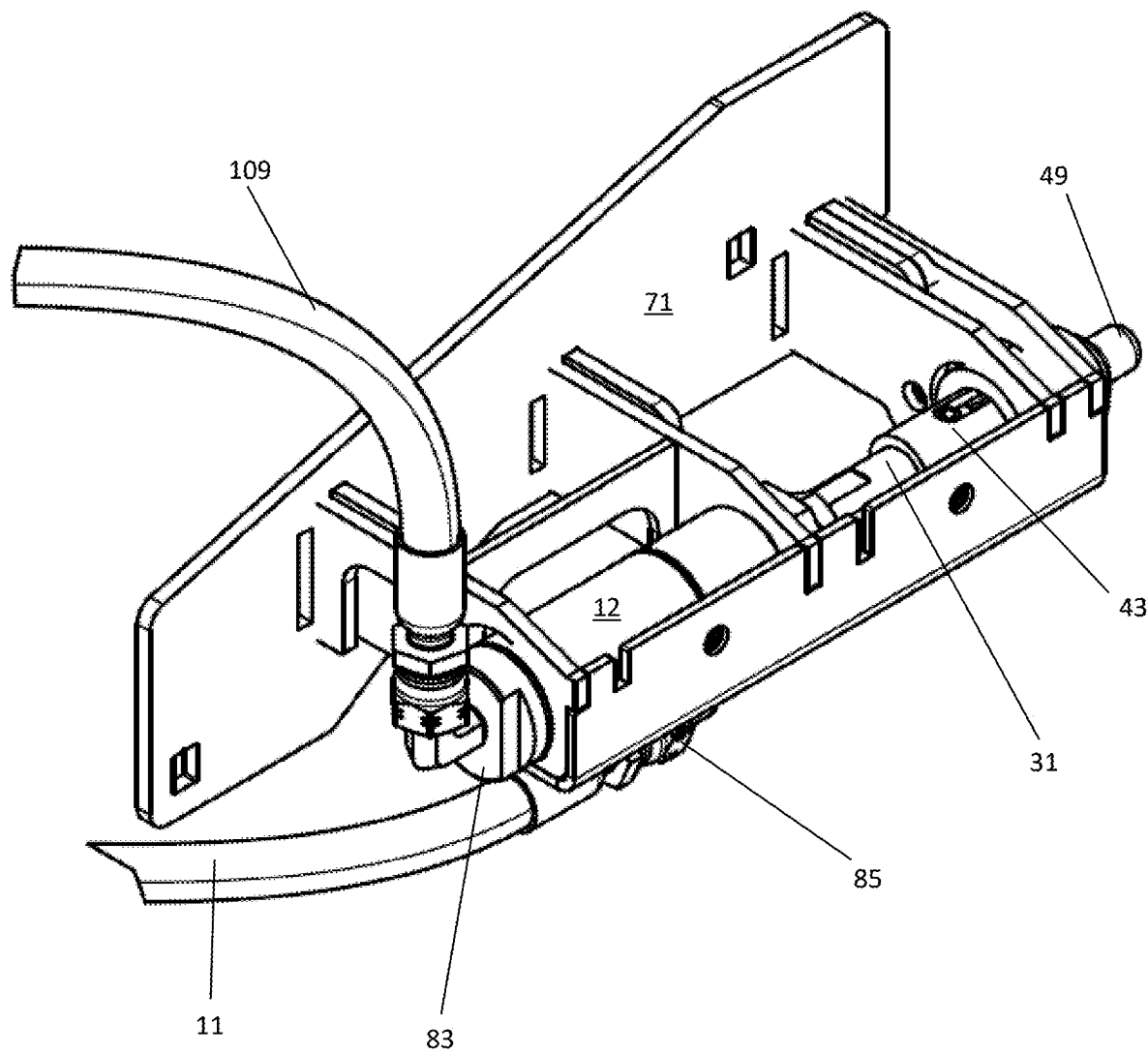
FIG. 12A is a perspective view of a wheel locking actuator of an exemplary embodiment of a wheel locking assembly and engagement system of the present disclosure.
Figure 12B:
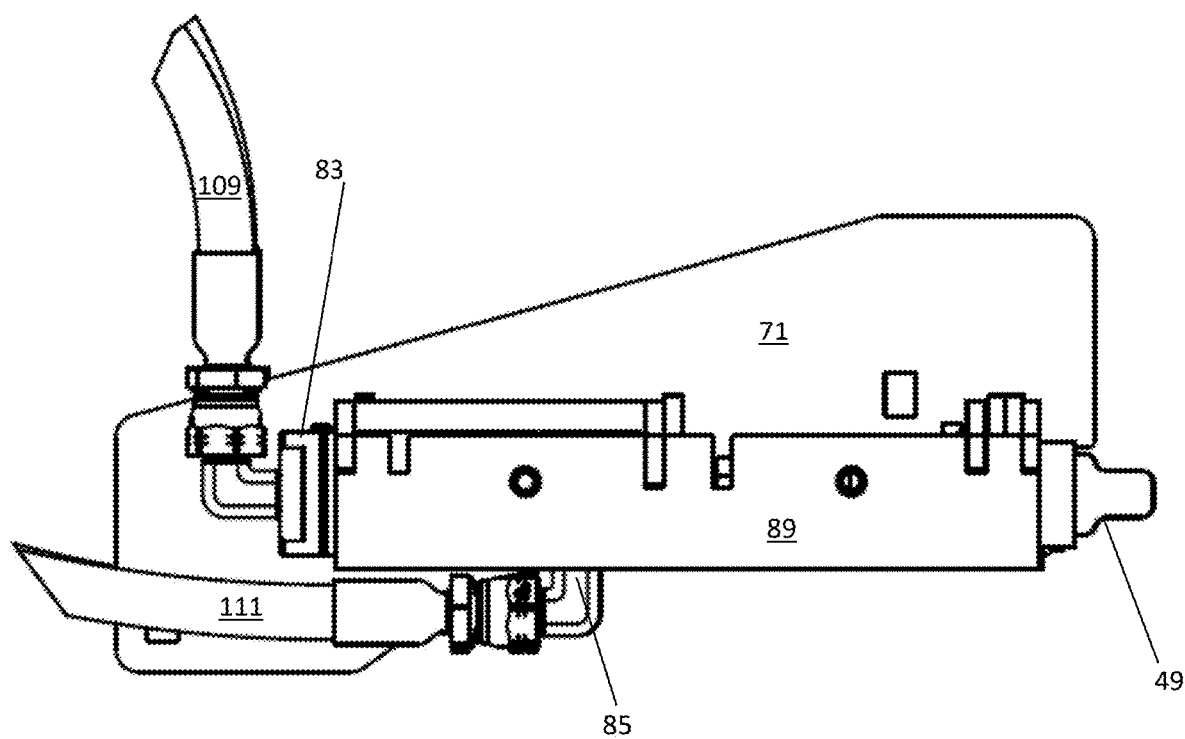
FIG. 12B is a side view of a wheel locking actuator of an exemplary embodiment of a wheel locking assembly and engagement system of the present disclosure.

As shown in FIGS. 12A-12B, a supply line 109 can be coupled to a first point 83 of the actuating means 11 and a separate supply line 111 can be coupled to a second point 85 of the actuating means. The first point 83 can supply hydraulic fluid to engage/extend the locking arm 31 via the actuating means 11 and the second point 85 can provide hydraulic fluid to disengage/retract the locking arm via the actuating means 11. In some embodiments, the locking arm and actuating means can be incorporated as a single element. Each of the actuating means 11 can have an actuator extension port 83 and an actuator retraction port 85. The wheel locking assembly valve can be controlled to direct hydraulic fluid to either the extension port 83 or the retraction port 85 as a user desires. A user can control the function through the switch 95 communicatively coupled to the wheel locking assembly valve 73. In embodiments that utilize electrically powered solenoids or other electrically powered actuating means a single line 87 may be communicatively coupled to the actuating means 11 or alternatively wirelessly communicatively coupled to the actuating means 11.

As shown in FIG. 8, some exemplary embodiments of the wheel locking system 100 can include a first actuating means 11a having a first locking arm 31a with a locking pin portion 43a and a second actuating means 11b having a second locking arm 31b with a locking pin portion 43b. The first and second locking arms 31a,b can correspond to a first and second swivel wheel assemblies 300. The wheel locking assembly valve 73 and hopper throttle valve 75 can be communicatively coupled to a control system 600 that can be utilized by a user to open or close the valves.

Figure 13A:
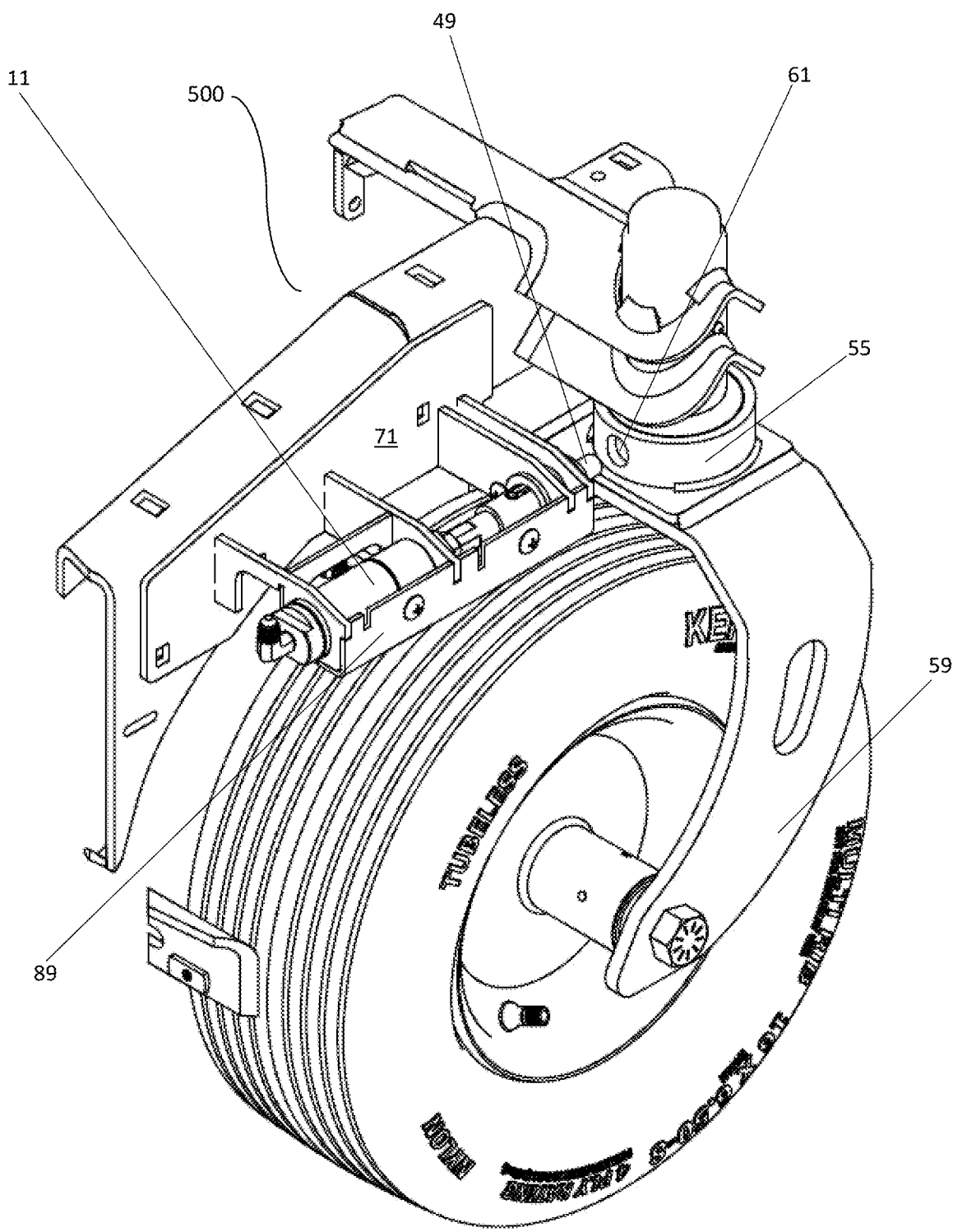
FIG. 13A an illustration an exemplary embodiment of a wheel locking assembly wherein the moveable arm is in a retracted position.

As illustrated in FIG. 13A, the locking arm 31 can be in a first position (disengaged position) to allow for the wheel assembly 300 to freely move and swivel around an axis. In some exemplary embodiment, when the locking arm 31 is in the first position the locking pin portion 43 does not contact the engagement flange 55 of the wheel assembly. A wall portion 56 of the engagement flange can be flat and/or smooth and can include on or more apertures 61 formed in one or more pre-determined locations on the engagement flange 55. When the locking arms are moved from the first position (retracted) to the second position (extended) the wheel assemblies can engage the with the wheel assemblies to lock the wheels in place and prevent from swiveling around an axis. The wheel locking assembly 200 can include one or more housings/brackets 89 to support one or more actuators 11 of the wheel locking assembly as well as to couple the assemblies 200 to a vehicle or desired piece of equipment.

Figure 13B:
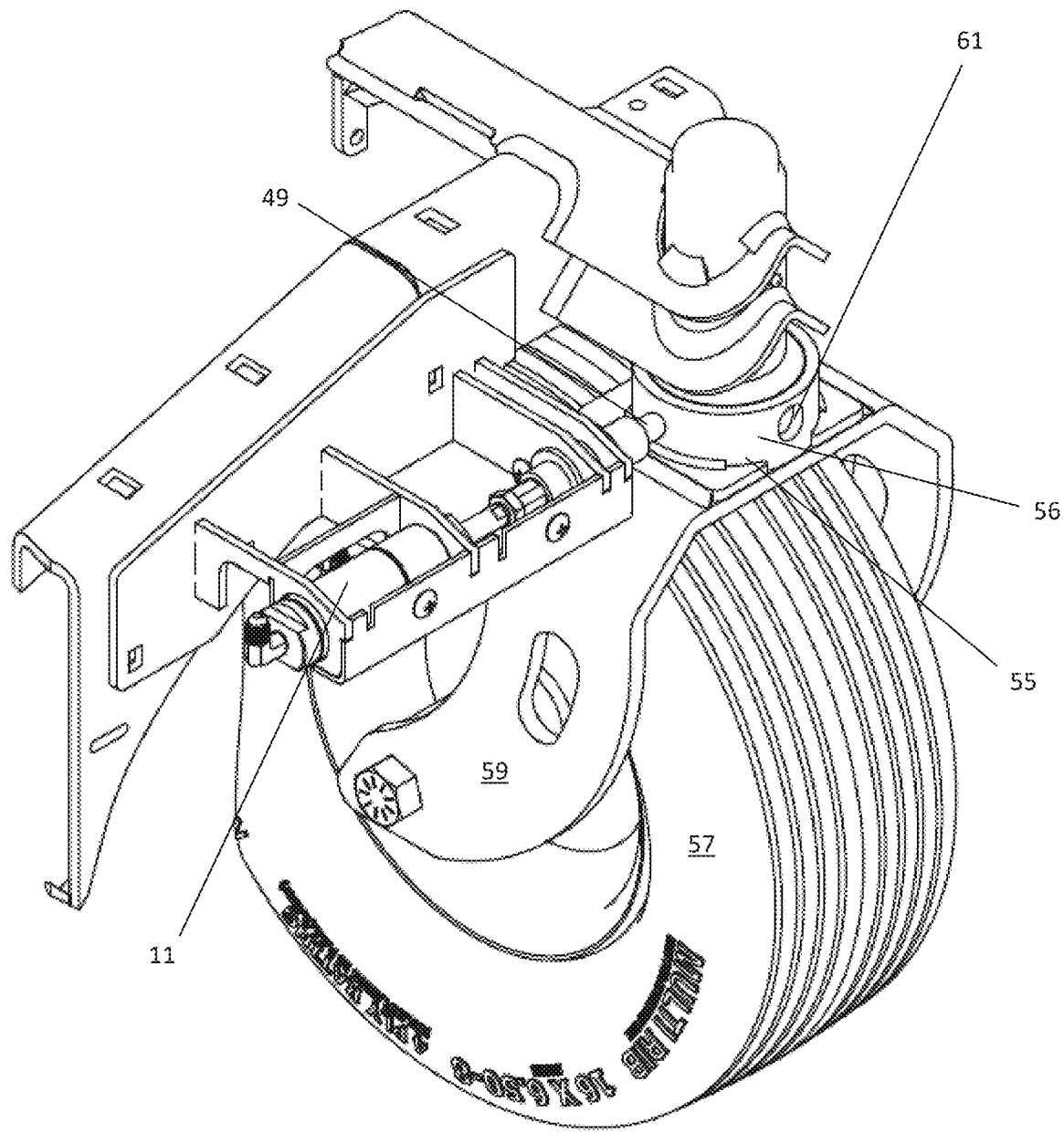
FIG. 13B is an illustration an exemplary embodiment of a wheel locking assembly with the moveable arm in an extended position and the locking pin portion is compressed and in contact with the engagement flange.

A locking arm 31 can be moved into a second position (engaged) by an actuating means 11. When the locking arm is moved into the second position, the locking pin portion 43 can be pressed against and contact the engagement flange 55 portion of the wheel assembly 300 as shown in FIG. 13B. This allows the locking pin portion 43 to have a relative first position and a second position from which it can move when pressed against the wall 56 of the engagement flange. When the locking pin portion 43 contacts the smooth portion of the engagement flange 55, the biasing means 29 can be compressed within the locking pin portion and slide within the locking pin channel 63 to apply a first pressure against the engagement flange 55 of the wheel assembly as shown in FIG. 13B.

When the locking pin portion 43 is compressed against the smooth surface of the engagement flange 55 the locking pin portion 43 can be considered to be in the second position. The locking pin portion 43 can be in the first position when the locking pin portion is not in contact with the engagement flange or when the locking arm 31 is in the first position (retracted position). Similarly, in some circumstances the locking pin portion 43 can be in the first position when it engages the aperture 61 of the engagement flange 55. In other embodiments, the locking pin portion 43 can be in a third intermediate position when it engages the aperture 61 of the engagement flange depending upon the tolerances of the locking arm assemblies. The biasing means 29 can apply pressure to the locking pin portion 43 to allow it to consistently contact the engagement flange 55 when the locking arm 31 is in the second position. This can allow the wheel assembly 200 to freely rotate around the axis until the aperture 61 rotates into position to engage the engagement member 49 of the locking pin portion 43 at which point the pressure exerted by the biasing means 29 forces the engagement member 49 into the aperture to lock the wheel assembly 300. In some exemplary embodiments, the wheel locking assembly 100 can include multiple locking arm assemblies 200 each for locking an individual wheel assembly 300 as shown in FIGS. 13A-13C and FIGS. 15A-B.

As previously recited the locking arm 31 can be moved from the first position to the second position, the locking pin portion 43 can be moved and contact the engagement flange 55 of the wheel assembly, as the locking arm 31 is further moved closer to the final second position, the biasing means 29 can be compressed into the second position. As the wheel assembly 300 rotates the pressure against the engagement flange 55 ensures that the locking pin portion 43 will engage an aperture 61 of the engagement flange 55 to ensure that the wheel is in a locked position and not able to further rotate around the axis. Similarly, when the locking arm is moved from the second position to the first position, the engagement member 49 will disengage from the aperture 61 and allow the wheel assembly 300 to freely rotate. The wheel locking mechanism of the present disclosure can be useful for various implements and vehicles such as material spreaders, tractors, or lawnmowers that utilize free rotating wheel assemblies, especially for navigating hills and sloped landscapes. The wheel locking assembly can also assist with maintaining the vehicle and/or implement in a straight line when operating on open terrain.

FIG. 13B provides an illustration of an exemplary embodiment of a locking arm assembly in a second position, the locking pin portion 43 can move from the first fully extended position to a second compressed position to maintain contact with the engagement flange 55 as it rotates due to the biasing means 29 within the interior cavity 90 of the locking arm assembly 200. As the wheel assembly rotates 300 and upon coming into contact with an engagement aperture 61, the pressure from the biasing means and applied against the engagement flange wall 56 can result in an engagement portion of the locking pin portion to move from a first position to a second position within the aperture and engage the aperture of the engagement flange to prevent the wheel assembly from being freely rotatable around its axis.

Figure 13C:
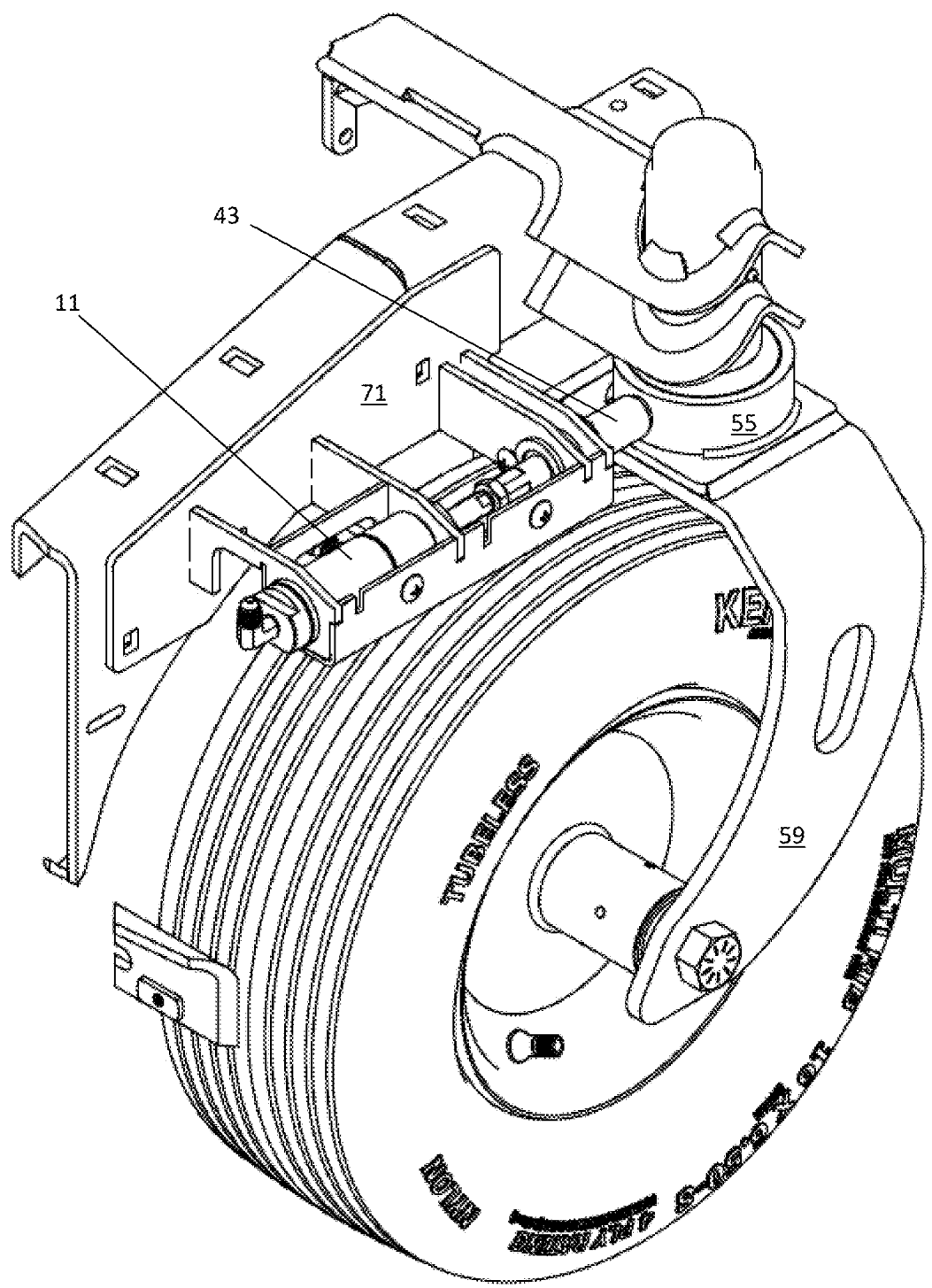
FIG. 13C is an illustration an exemplary embodiment of a wheel locking assembly with the moveable arm in an extended position and the locking pin portion fully engaged with the aperture of the engagement flange.

As the wheel assembly 300 rotates around an axis, once the engagement portion of the locking pin portion encounters the aperture 61 of the engagement flange 55, the pressure from the biasing means 29 can engage the locking pin portion 43 to move from the second position back to the first position while the locking arm 31 is still in the second position as shown in FIG. 13C. The aperture 61 can be sized similar to the engagement portion 49 of the locking pin portion 43 to allow the engagement portion 49 to engage and be at least partially located within the aperture thereby limiting and/or preventing the rotation of the wheel assembly around the axis.

A locking arm bracket can include a plurality of support/mounting members that can be coupled to a vehicle or vehicle frame support member/bracket 71. The various support members can include a plurality of apertures that can allow for the locking arm assemblies to pass through the various apertures of the mounting bracket. A frame mounting bracket that can be coupled to a vehicle 500 and the actuating means bracket 89 can similarly be coupled to the frame bracket 71 or incorporate as a single bracket into the frame bracket 71. Additionally, the locking arm mounting bracket can be coupled to the frame mounting bracket to retrofit various vehicles with the wheel locking apparatus of the present disclosure.

Figure 14A:
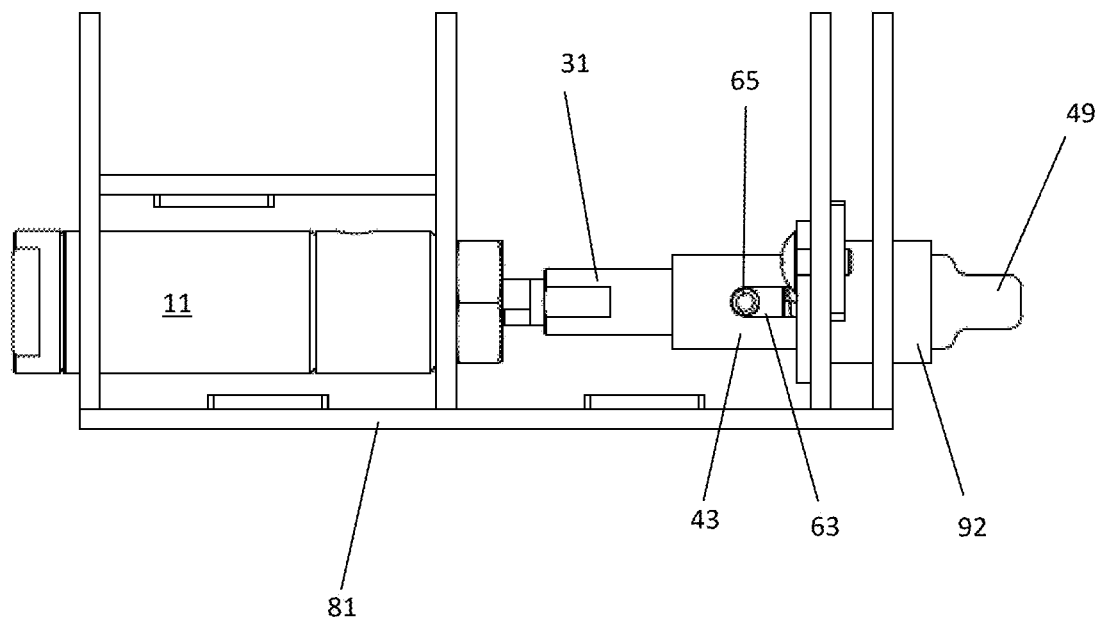
FIG. 14A is a top view of an exemplary embodiment of a wheel locking arm assembly of the present disclosure.
Figure 14B:
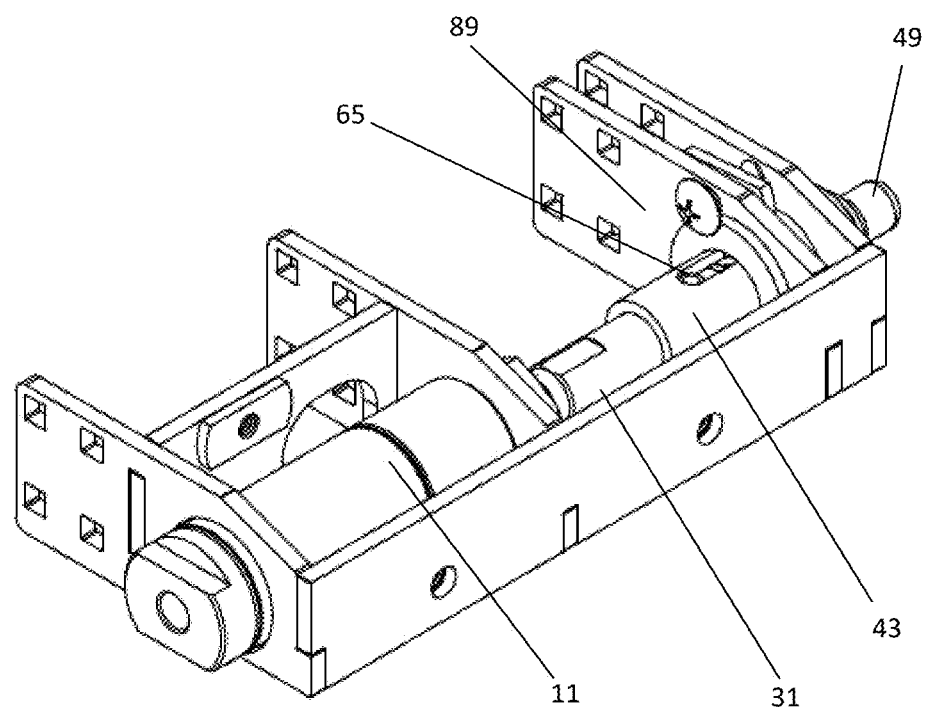
FIG. 14B is a perspective view of an exemplary embodiment of a wheel locking arm assembly of the present disclosure.
Figure 14C:
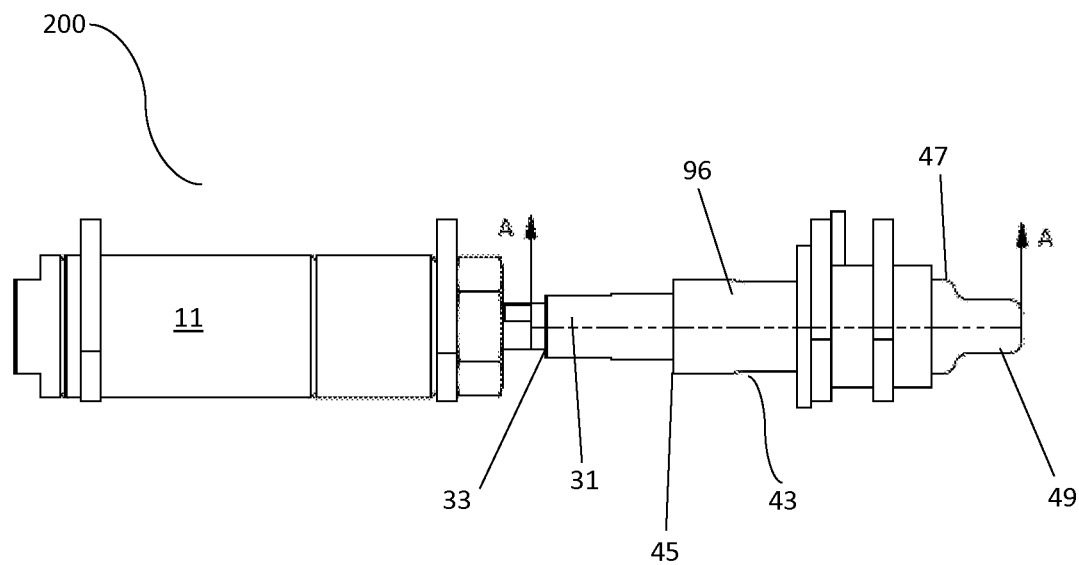
FIG. 14C is a side view of an exemplary embodiment of a wheel locking arm assembly of the present disclosure.
Figure 14D:
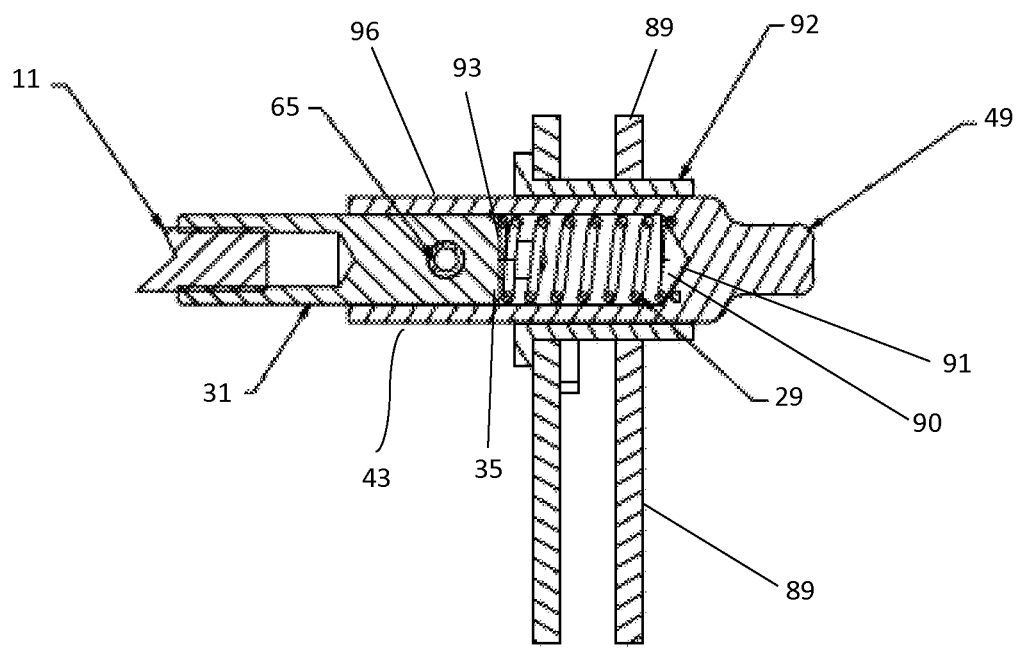
FIG. 14D is a cutaway view of an exemplary embodiment of the locking pin portion of a wheel locking arm assembly of the present disclosure along axis A-A of FIG. 14C.
Figure 14E:
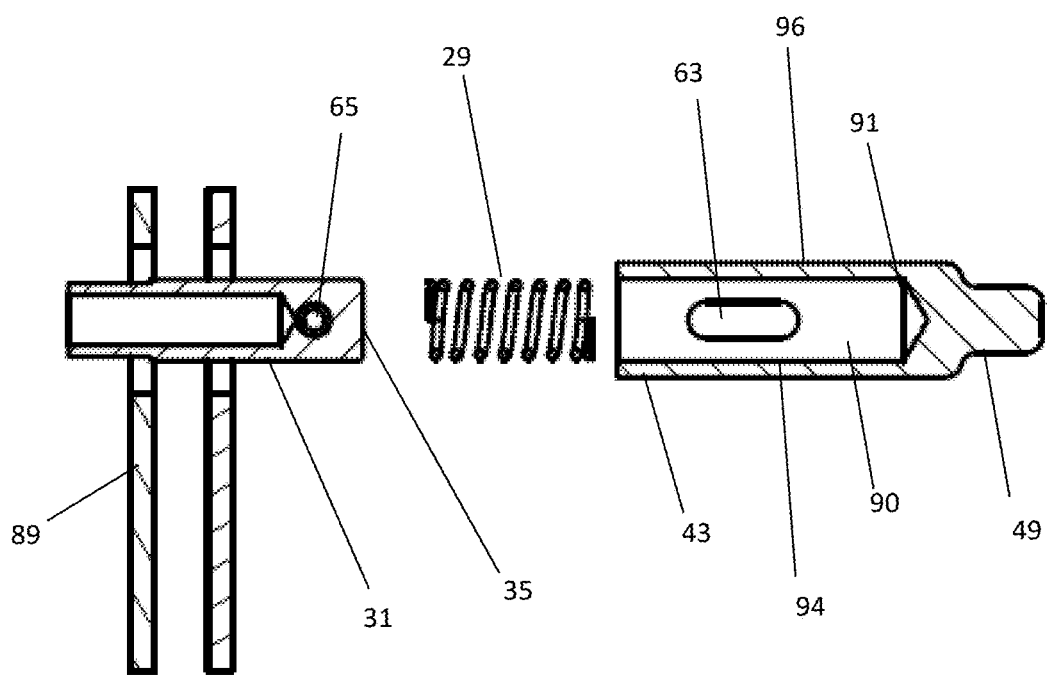
FIG. 14E is an exploded view of an exemplary embodiment of the locking pin portion of a wheel locking arm assembly of the present disclosure of FIG. 14D.
Figure 14F:
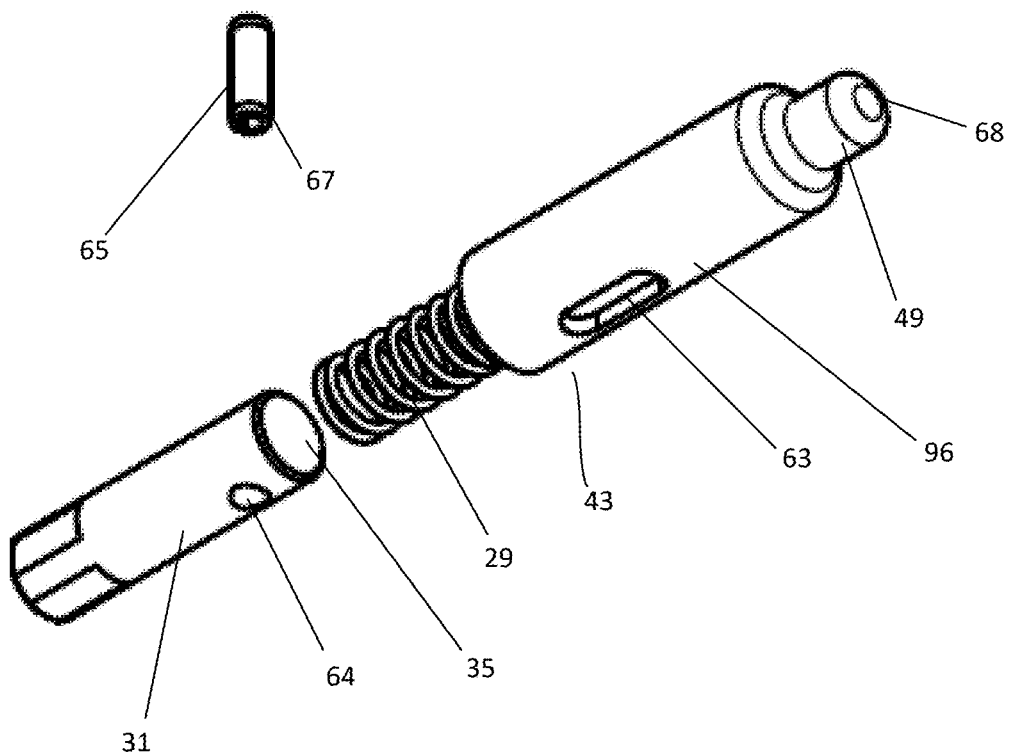
FIG. 14F is a perspective exploded view of a locking pin portion of the present disclosure.

As shown in more detail in FIGS. 14A-F, a wheel locking assembly of the present disclosure can include an actuator 11 which can include or be coupled to an actuating arm portion 31. The actuator can move the arm portion 31 between a first and second position which can in turn also move the locking pin portion 43 located on a second end of the actuating arm 31. As shown in FIG. 14D, the locking pin portion 43 can include an interior cavity 90 for housing a biasing means 29. The interior cavity 90 can have an interior wall 94. A first end of the biasing means can be compressed against an end wall 91 within the cavity of the locking pin portion 43. In some embodiments, the second end of the biasing means can be compressed against an end face 93 of the actuator arm 31 or alternatively against a post member 65 coupled to the locking arm 31.

In some exemplary embodiments, a channel locator pin 65 can be included on a portion of the locking arm 31 and within the channel 63 to guide the locking pin portion 43 when moving between a first and second position. The post member 65 can be removably coupled from the locking arm 31 using any suitable means, including but not limited to a threaded connection. In some embodiment, the locking arm 31 can have a locking pin aperture 64 formed to allow for the locking pin to be installed. The aperture 64 can be threaded and the post member 65 can similarly have a threaded portion 67 to allow for the pin to be removed to disassembly the locking pin portion of the locking arm assembly 200. The post member 65 can help maintain the locking pin portion 43 to the end of the locking arm 31. The locking pin channel 63 can allow for the locking pin portion 43 on a linear plane relative to the portion of the locking arm positioned within the cavity 90 of the locking pin portion as shown in FIG. 14D. The cavity can be large enough to allow for a portion of the locking arm 31 to be housed within the locking pin portion as well as a biasing means 29. Additional support member 92 can be utilized to maintain the locking pin portion in the desired location and further prevent any lateral movement of the locking pin portion when it is moving between a first and second position.

The biasing means can be located within the locating pin portion and similarly the post member 65 can provide a surface for the biasing means 29 to compress against when the locking arm 31 is engaged and the locator pin portion 43 contacts the engagement flange 55. The post member 65 can fit within the channel 63 to allow the locking pin portion 43 moving between one or more positions along an axis when pressure is applied to the biasing means. The pressure applied to the biasing means 29 can be from the arm portion being moved from a first position to a second position which in some exemplary embodiments will result in the locking pin portion 43 to come into contact with the engagement flange portion 55 of the wheel assembly 300 as shown in FIG. 13B and the eventually to engage the aperture as shown in FIG. 13C as the wheel assembly rotates into position.

Figure 15A:
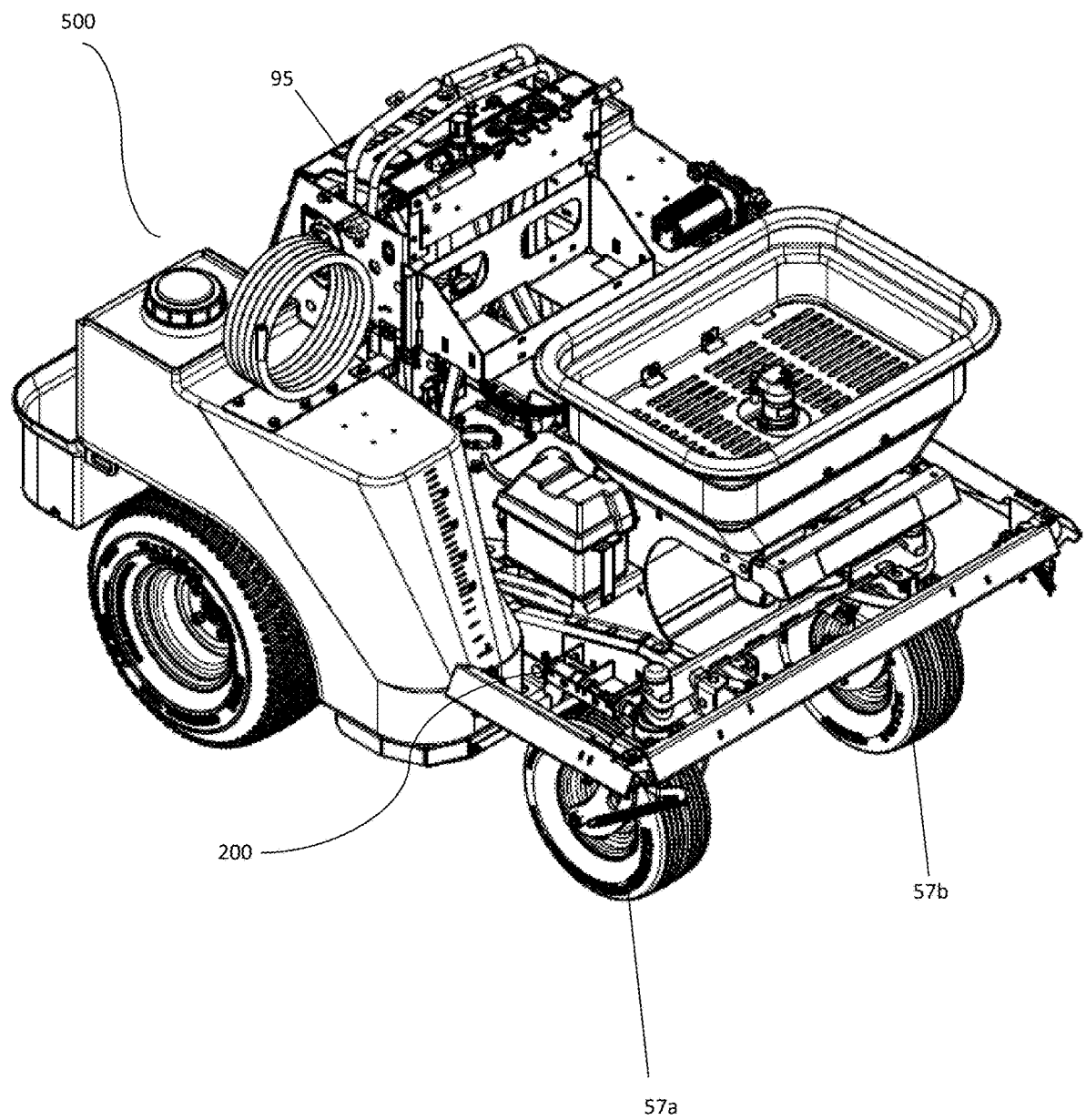
FIG. 15A is a perspective view of an exemplary embodiment of a vehicle and a wheel locking assembly of the present disclosure.
Figure 15B:
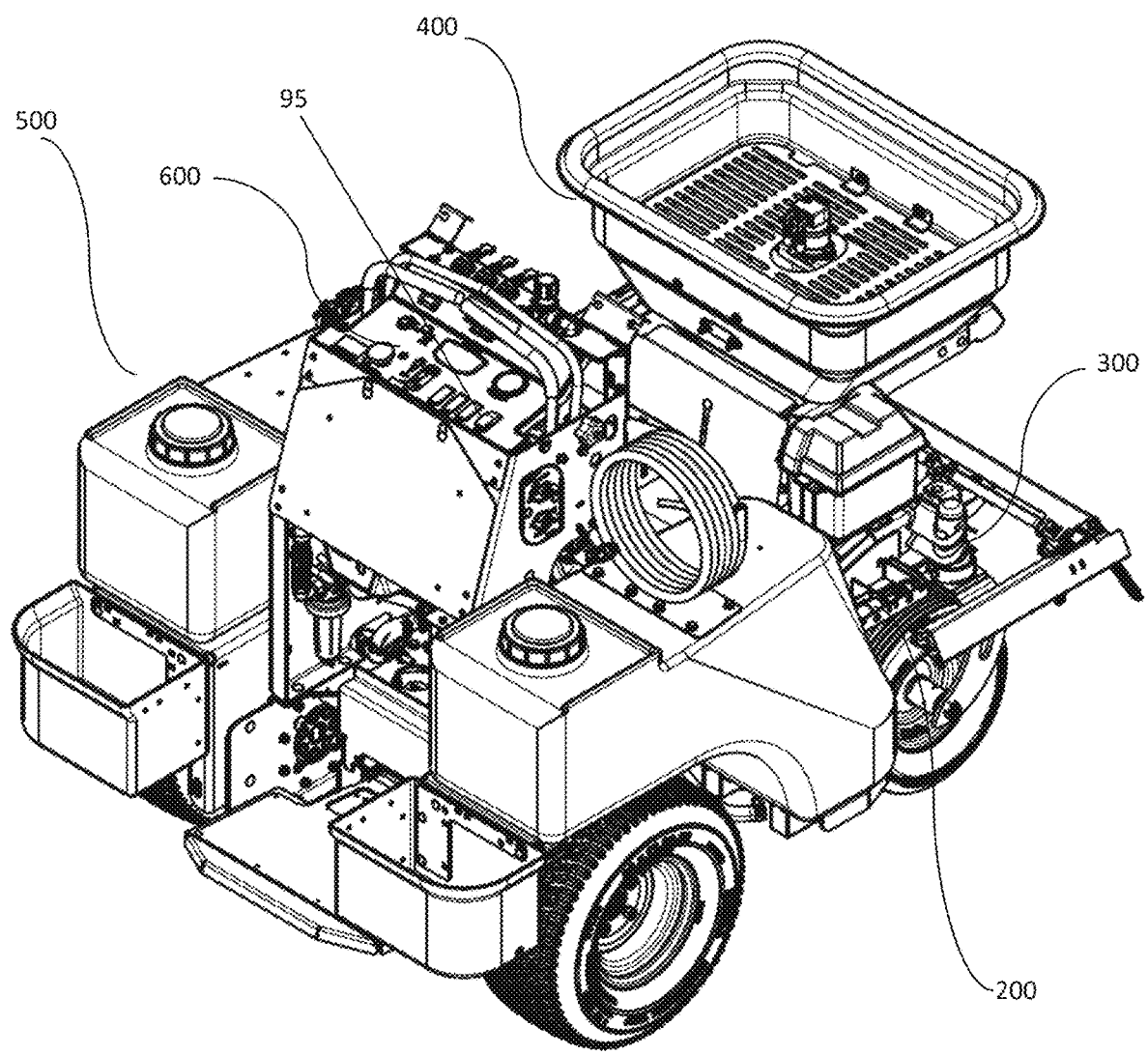
FIG. 15B is another perspective view of an exemplary embodiment of a vehicle and a wheel locking assembly of the present disclosure.

As shown in FIGS. 15A-B, the system can be incorporated into various types of equipment 500 or vehicles including but not limited to lawn mower, seeder-sprayers, and other types of equipment that utilize swivel wheel assemblies. In some exemplary embodiments, the equipment 500 can be outfitted with the wheel locking system 100 of the present disclosures. The equipment 500 can have a first and second wheel assembly that correspond to a respective wheel locking arm assembly 200. The equipment can utilize various different types of system but can include the aforementioned hydraulic system can power the wheel locking system 100 as well as a hopper system 400 or a hydrostatic transmission.

In some embodiments, the actuating means can be directly coupled using a wire to the control module. Alternatively, the actuating means can be wirelessly controlled by the control module using any suitable wireless networks, including but not limited to Bluetooth, NFC, WiFi. Both the control module and actuating means can be communicatively couple to a power source. The power source used to provide power to the actuating means and the control module Alternatively, or in addition to a manual override or engagement means can be incorporated with the actuating means 11. In other exemplary embodiments, the actuating means 11 can be electrically powered and communicatively coupled to a control system/control module. In some exemplary embodiments, the control system can be communicatively coupled to one or more actuating means 11 that can be coupled to a or form a portion of locking arm 31. The control system can be communicatively coupled to a switch 95 to allow a user to extend or retract the locking arm 31 by providing a signal to an electric actuator to extend or retract the actuating means.

While the invention has been illustrated and described in detail in the drawings and foregoing description, the same is to be considered as illustrative and not restrictive in character, it being understood that only, the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A wheel locking system for selectively locking the movement of a swivel wheel, said system comprising:
   a wheel assembly comprising:
      a body portion comprising an engagement flange, wherein the engagement flange includes a flange wall and a flange aperture formed within the flange wall, and
      a wheel portion;
   a hydraulic actuator comprising a hydraulic cylinder, wherein the hydraulic cylinder configured to be fluidly connected to a wheel locking assembly valve, wherein the wheel locking assembly valve includes a at least one supply line and at least one return line, wherein hydraulic fluid from the at least one supply line is fluidly connected to a first point on the hydraulic cylinder and the at least one return line is fluidly coupled to a second point on the hydraulic cylinder; and
   a locking arm assembly coupled to an end of the hydraulic actuator, wherein the locking arm assembly comprises:
      a first locking arm having a first end and a second end, wherein the first locking arm is configured to be moved from a first position to a second position;
      a locking pin having a first end and a second end, wherein the locking pin comprises an exterior wall, an interior cavity at the first end, a locking pin channel formed between the first end and the second end of the locking pin, wherein the channel forms a passage from the exterior wall into the interior cavity of the locking pin, and an engagement member at the second end, wherein a first portion of the first locking arm resides within the interior cavity, wherein the locking pin is configured to slide along a linear path on the first locking arm;
      a biasing means positioned within the interior cavity between the first end of the first locking arm and an interior wall of the interior cavity, wherein the biasing means is configured to allow the locking pin to move along the linear path between an uncompressed position to a compressed position and maintain a pressure against the flange wall when the hydraulic actuator moves the first locking arm from a first position to a second position,
   wherein the wheel assembly is configured to rotate around an axis and the engagement member maintains contact with the flange wall until the wheel rotates into a position wherein the flange aperture is engaged by the engagement member.

2. The wheel locking system of claim 1, wherein the engagement member has a diameter smaller than the diameter of the exterior wall portion at the first end of the engagement member.

3. The wheel locking system of claim 1, further comprising a post member, wherein the post member is removably couplable to a portion of the first locking arm positioned within the interior cavity of the locking pin, wherein the post member is configured to maintain a portion of the first locking arm within the interior cavity of the locking pin and allow the locking pin to be moveable along a linear plane.

4. The wheel locking system of claim 3, wherein the locking pin channel and post member areis configured to maintain the locking pin on the end of the first locking arm and between the uncompressed position and compressed position when the first locking arm is extended to the second position to contact the engagement flange.

5. The wheel locking system of claim 2, wherein the biasing means biases the locking pin outward to maintain contact between the locking pin and the engagement flange wall of the wheel assembly when the locking arm is in the second position and the wheel assembly rotates around the axis.

6. The wheel locking system of claim 4, wherein the engagement member engages the engagement aperture of the wheel assembly in a locked position and the wheel assembly is restricted from swiveling around the axis.

7. The wheel locking system of claim 1, wherein the first locking arm is moved from a first position to a second position by a hydraulic pump pumping hydraulic fluid into the at least one supply line.

8. The wheel locking system of claim 5, wherein the wheel locking system further comprises a control system, wherein the control system is communicatively coupled to the hydraulic actuator to move the first locking arm coupled to the hydraulic actuator from a first position to a second position.

* * * * *